US005389051A

United States Patent [19]

Hirate et al.

[11] Patent Number: 5,389,051

[45] Date of Patent: Feb. 14, 1995

[54] METHOD OF AND APPARATUS FOR CONTROLLING ENGINE SPEED OF A VEHICLE ENGINE

[75] Inventors: Hiroshi Hirate; Kohta Ohtoshi; Tomohiro Iwai, all of Kariya, Japan

[73] Assignee: Kabushiki Kaisha Toyoda Jidoshokki Seisakusho, Kariya, Japan

[21] Appl. No.: 988,109

[22] PCT Filed: May 22, 1992

[86] PCT No.: PCT/JP92/00664

§ 371 Date: Jan. 22, 1993

§ 102(e) Date: Jan. 22, 1993

[87] PCT Pub. No.: WO92/20914

PCT Pub. Date: Nov. 26, 1992

[30] Foreign Application Priority Data

| | | | |
|---|---|---|---|
| May 23, 1991 | [JP] | Japan | 3-118430 |
| Jul. 19, 1991 | [JP] | Japan | 3-179953 |
| Aug. 23, 1991 | [JP] | Japan | 3-212259 |
| Aug. 31, 1991 | [JP] | Japan | 3-220790 |
| Aug. 31, 1991 | [JP] | Japan | 3-220792 |
| Aug. 31, 1991 | [JP] | Japan | 3-220800 |

[51] Int. Cl.[6] .......... B60K 41/00

[52] U.S. Cl. .......... 177/111; 364/424.1; 477/107

[58] Field of Search .......... 74/857, 859, 860, 866; 364/424.1

[56] References Cited

U.S. PATENT DOCUMENTS

| | | | |
|---|---|---|---|
| 4,397,379 | 8/1983 | Baudoin | 74/866 X |
| 4,484,497 | 11/1984 | Hibino | 74/859 OR |
| 4,924,832 | 5/1990 | Abe | 74/860 X |
| 4,931,939 | 6/1990 | Kawata et al. | 364/424.1 X |
| 5,161,503 | 11/1992 | Yano et al. | 74/860 X |
| 5,249,484 | 10/1993 | Matsuoka et al. | 74/866 OR |

FOREIGN PATENT DOCUMENTS

| | | |
|---|---|---|
| 52-3931 | 1/1977 | Japan . |
| 57-97035 | 6/1982 | Japan . |
| 60-111029 | 6/1985 | Japan . |
| 63-140842 | 6/1988 | Japan . |

OTHER PUBLICATIONS

International Search Report dated Jul. 28, 1992 issued by the Japanese Patent Office in connection with the subject International Application.

*Primary Examiner*—Dirk Wright

*Attorney, Agent, or Firm*—Brooks Haidt Haffner & Delahunty

[57] ABSTRACT

An engine speed control system for controlling the engine speed of an engine (30) for driving an industrial vehicle includes a control unit (50, 70, 85, 95) provided with an internal memory (72) and a first control system which reads a desired engine speed corresponding to an angular displacement of the accelerator pedal (44) detected by an accelerator pedal displacement detecting means (52) from the memory (72) when the running speed of the vehicle is not higher than a maximum running speed set by a maximum running speed setting means (56, 58, 76) connected to the control unit (50, 70, 85, 95) and controls an actuator (38) so as to regulate the opening of a throttle valve (36) of the carburetor (32) such that the engine speed coincides with the desired engine speed read from the memory (72), and a second control system that reads an upper limit desired engine speed for the engine (30) corresponding to the preset maximum running speed when the running speed reaches the preset maximum running speed and controls the actuator (38) so as to regulate the opening of the throttle valve (36) such that the engine speed coincides with the upper limit desired engine speed read from the memory (72).

13 Claims, 19 Drawing Sheets

METHOD OF AND APPARATUS FOR CONTROLLING ENGINE SPEED OF A VEHICLE ENGINE

TECHNICAL FIELD

The present invention relates to a method of and apparatus for controlling the speed of an automotive engine, and more particularly, to a method of and apparatus for controlling the speed of an internal combustion engine mounted on an industrial vehicle such as a forklift truck or a carrier vehicle, to an appropriate speed level according to the running conditions of the industrial vehicle.

BACKGROUND ART

Generally, for industrial vehicles running under specific running conditions, such as operating on specific terrain (yard) or operating at night, maintenance of an appropriate running speed is usually required. Accordingly, it has been a common practice to equip the industrial vehicle with a running speed control apparatus for controlling the running speed of the industrial vehicle according to the running conditions or with an engine speed control apparatus for controlling the engine speed of the internal combustion engine and thereby limiting the maximum running speed of the industrial vehicle. A prior art running speed control apparatus is provided with an alarm means that generates an alarm signal to warn the driver upon detection of a running speed exceeding a predetermined maximum running speed. A prior art engine speed control apparatus is provided with a speed reducing means that automatically reduces the engine speed to idling speed upon detection of a running speed exceeding a predetermined maximum running speed.

FIG. 22 is a diagrammatic illustration of an example of the above-mentioned prior art, i.e., an apparatus for controlling the running speed of an industrial vehicle through the control of the speed of the internal combustion engine of an the industrial vehicle.

Referring to FIG. 22, when the accelerator pedal 2 of a vehicle mounted with an engine 1 is depressed, a throttle lever 4 connected to the accelerator pedal 2 by a throttle cable 3 opens the throttle valve 5 of a carburetor 6, potentially to its fully open position, and when the displacement of the accelerator pedal is reduced, the opening of the throttle valve 5 is reduced accordingly. Thus, the speed of the engine is controlled by operating the accelerator pedal 2.

An actuator 7, such as an electromagnetic clutch having a pair of clutch plates, is provided on a transmission line for transmitting the movement of the accelerator pedal to the throttle lever 4. Normally, the actuator 7 is in an off-state (for the electromagnetic clutch, a state such that the pair of clutch plates are engaged) and the throttle valve 5 is operated according to the displacement of the accelerator pedal 2. A running speed sensor 8 provides a running speed signal representing the running speed of the vehicle to an ECU (electronic control unit) 10 comprising a microcomputer. Upon detection of a running speed exceeding an upper limit running speed from the running speed signal provided by the running speed sensor 8, the ECU 10 turns on the actuator 7 (for the electromagnetic clutch, a state such that the pair of clutch plates are disengaged). With the actuator 7 turned on, the depression displacement of the accelerator pedal 2 is not transmitted to the throttle cable 3, so that the throttle valve 5 returns to its fully closed position and the engine 1 operates at idling speed.

When the accelerator pedal 2 is released, the accelerator pedal 2 closes an idling switch 9, and upon receipt of a signal through the idling switch 9, the ECU 10 generates a signal to turn off the actuator 7. Consequently, control of the throttle valve 5 using the accelerator pedal 2 is resumed.

Although the prior art running speed control system provided with the alarm means generates an alarm signal, the running speed of the vehicle cannot be actually controlled unless a driver carries out a necessary decelerating operation including releasing the accelerator pedal and applying the brake.

When the engine is controlled by the prior art engine speed control apparatus capable of automatically reducing the engine speed to idling speed, a driver will experience unpleasant deceleration because the engine speed drops sharply from a high speed to idling speed. Furthermore, it is inconvenient for the accelerator pedal to be released in order to restore the normal function of the accelerator pedal.

On the other hand, the load of the hydraulic pump for operating the cargo handling system, the power steering system and the brake mechanism, in addition to the running load, acts on the internal-combustion engine of the industrial vehicle. The internal-combustion engine provides output torque necessary for maintaining the idling speed during an idling operation. Therefore, the engine speed will drop below the idling speed and, in some cases, the internal-combustion engine will stall if an excessively large load exceeding the torque acts on the internal-combustion engine during an idling operation. The power steering system of a forklift truck, in particular, is frequently operated during an idling operation, and the internal-combustion engine often stalls when the steering mechanism is turned through a large angle during the idling operation, because the torque required for driving the hydraulic pump to steer the forklift truck when the steering mechanism is turned through a large angle exceeds the idling torque of the internal-combustion engine. Accordingly, an idling speed increasing device as shown in FIG. 23 has been employed to overcome such a disadvantage.

A throttle valve 5 is pivotally supported by a throttle shaft 5*a* within the barrel of a carburetor 6. A U-shaped suction pipe 11 has one end connected to the carburetor 6 at a position on the suction pipe side of the engine with respect to the throttle valve 5, and the other end is connected to a throttle valve operating device 12.

The throttle valve operating device 12 comprises a diaphragm case 13, a diaphragm 14 partitioning the interior of the diaphragm case 13 into two chambers, and a throttle valve operating rod 15 attached to the diaphragm 14 for operating the throttle valve 5. A spherical throttle valve pushing member 15*a* is attached to the free end of the throttle valve operating rod 15. The negative pressure or vacuum prevailing within the suction pipe 11, and the front chamber 16 of the diaphragm case 13 communicating with the suction pipe 11, is equal to the intake pressure, i.e., a negative pressure, prevailing within the carburetor 6. The diaphragm 14 retains a normal shape while the pressure in the front chamber 16 is equal to the ambient pressure, i.e., the atmospheric pressure acting on the idling speed increasing device 12. The diaphragm 14 bulges into the front chamber 16 when the pressure in the front chamber 16 decreases below the atmospheric pressure. Thus, the diaphragm 14 retains a normal shape when the intake pressure prevailing within the carburetor 6 is equal to the atmospheric pressure and bulges into the front chamber 16 when the intake pressure decreases below the atmospheric pressure.

When the diaphragm 14 bulges into the front chamber 16, the throttle valve operating rod 15 is retracted accordingly into the diaphragm case 13 and, as the degree of projection of the diaphragm 14 decreases, the throttle valve operating rod 15 advances accordingly into the carburetor 6. Thus, the throttle valve operating rod 15 is retracted toward the front chamber 16 when the intake pressure prevailing within the carburetor 6 decreases below atmospheric pressure and advances into the carburetor 6 as the intake pressure approaches atmospheric pressure.

Incidentally, the throttle valve 5 is held at a predetermined idling opening sufficiently large to maintain the idling speed during an idling operation. Therefore, the engine speed drops below idling speed if the engine is loaded with an additional load during the idling operation. Under such operating conditions, the idling speed can be recovered by increasing the air intake rate, that is, the engine speed can be increased by increasing the opening of the throttle valve 5 according to the air demand.

The intake pressure increases when the engine speed decreases below idling speed due to the effect of an additional load acting on the engine during an idling operation, and the degree of projection of the diaphragm 14 into the front chamber 16 then decreases accordingly, and the throttle valve operating rod 15 advances into the carburetor 6. Consequently, the throttle valve pushing member **15*a* pushes the throttle valve 5 to open the same, and the opening of the throttle valve 5** increases to increase the air intake rate as the intake vacuum decreases.

When the engine speed decreases below idling speed, the idling speed increasing device shown in FIG. 23 increases the opening of the throttle valve 5 according to a reduction of the engine speed thereby increasing the engine speed by increasing the air intake rate. Accordingly, the engine will not stall even if the engine is loaded with an excessively large load during an idling operation.

Another method of preventing an engine from stalling when subjected to an excessively large load during an idling operation employs an electronic governor that controls the engine speed in a PID control (proportional-plus-integral-plus-derivative control) instead of the foregoing engine speed increasing device.

This electronic governor detects actual engine speed from an ignition signal provided by the ignition system, determines the deviation of the detected actual engine speed from a desired engine speed, i.e., the idling speed, and carries out a PID operation for PID control at a gain determined from the deviation to determine a desired opening of the throttle valve 5 necessary for maintaining the idling speed so as to prevent the engine from stalling.

However, the engine speed increasing device is unable to regulate and change the opening of the throttle valve 5 optionally according to engine operating conditions when the engine speed decreases, and the intake pressure does not increase instantaneously in response to the drop in engine speed; the intake pressure starts increasing with a time lag after a reduction in engine speed. Therefore, the engine speed increasing device is unable to increase the opening of the throttle valve 5 instantly upon application of an additional load to the engine and is unable to cope with a sharp engine load variation. Thus, the engine speed increasing device has a problem in its response characteristics.

When power is required to drive the hydraulic pump for operating the steering system while the engine is idling, the variation time of the pressure of the working fluid discharged from the hydraulic pump to operate the steering system, which will be referred to as "power-steering pressure 17", corresponds to the variation time of the power for driving the hydraulic pump as shown in FIG. 24. When the engine speed is controlled by the foregoing electronic governor, the period of the ignition signal 18 increases with an increase in the power steering pressure 17 and, consequently, the engine speed decreases. However, the increase in the period of the ignition signal 18 does not respond instantly to an increase in the power-steering pressure 17, that is, the reduction in engine speed lags behind the increase of the load on the engine. As shown in FIG. 24, the engine stalls at time A.

The intake pressure 19 of the carburetor increases as the power-steering pressure 17 increases. However, a variation of the intake pressure 19 does not respond instantly to a variation of the cyclic period of the ignition signal 18; that is, the intake pressure 19 increases with a time lag after a reduction in engine speed.

In a four-cycle four-cylinder engine, ignition occurs twice for each revolution of the output shaft. Therefore, the electronic governor determines the actual engine speed from the sum of the cyclic periods of the two ignition signals 18 each time the electronic governor receives two ignition signals 18, and carries out the PID control operation with reference to actual engine speed. Therefore, if the load on the engine changes suddenly while the electronic governor receives the two ignition signals 18, the electronic governor is unable to detect the sudden variation of the load on the engine. Thus, the electronic governor has a problem in its response characteristics.

If the electronic governor is capable of determining a desired throttle valve opening by determining actual engine speed each time the ignition signal 18 is given to the electronic governor, the electronic governor may be able to deal with a sudden load change during an idling operation and the response characteristics of the electronic governor may be improved. However, if the opening of the throttle valve is controlled in such a mode, the opening of the throttle valve will change in response to a slight change in the period of the ignition signal 18 when the engine operates at a high engine speed, which makes the engine speed unstable.

The cyclic period of the ignition signal 18 at time B when the power-steering pressure 17 is increased is longer than the cyclic period of the ignition signal 18 at time C when the engine is idling and the power-steering pressure 17 is not increased. The engine can be prevented from stalling if the opening 20 of the throttle valve is increased at time B to increase the air intake rate; that is, stalling can be avoided by determining the deviation of the actual engine speed at time B from the idling speed and determining the gain for PID control from the deviation. However, the gain thus determined is excessively large for the PID control of engine speed when the engine operates at a high speed, which also makes the engine speed unstable.

In FIG. 24, the opening 20 of the throttle valve remains unchanged regardless of an increase in the power-steering pressure 17, because the gain for the PID control of the engine speed is determined so that the gain is not excessively large for controlling the engine speed while the engine is operating at a high speed.

Thus, the ability of the electronic governor to adjust and change the opening of the throttle valve for the actual engine speed optionally by changing the gain of the PID control is superior to the ability of the idling speed increasing device shown in FIG. 23. However, the electronic governor has contradictory problems in that the response characteristics of the electronic governor are not satisfactory during an idling operation if the engine speed control mode is determined primarily for a high engine speed and the stability of the engine speed deteriorates when the engine operates at a high speed if the engine speed control mode is determined primarily for the idling speed.

SUMMARY OF THE INVENTION

In view of the foregoing problems in the prior art, it is a primary object of the present invention to provide a method of and apparatus for controlling the speed of an automotive engine, capable of overcoming the disadvantages of the prior art method of controlling the speed of an automotive engine.

Another object of the present invention is to provide an engine speed control apparatus for controlling the speed of an engine mounted on a vehicle, the apparatus being provided with a control means capable of controlling the vehicle for safe running at a running speed below a limit running speed when the vehicle is operating under difficult running conditions, such as operating on specific terrain or operating at night.

A further object of the present invention is to provide an engine speed control apparatus for controlling the speed of an engine mounted on a vehicle, the apparatus being capable of automatically reducing the speed of the engine to an upper limit engine speed without releasing the accelerator pedal of the vehicle, even when the running speed of the vehicle exceeds a predetermined maximum running speed, to control the vehicle.

A still further object of the present invention is to provide an engine speed control apparatus for controlling the speed of an engine mounted on a vehicle, the apparatus being capable of controlling the speed of the automotive engine without entailing an overshoot, in which the actual engine speed exceeds a desired engine speed for a predetermined maximum running speed, when the transmission mechanism of the power transmission system of the vehicle is shifted from a first speed to a second speed and the accelerator pedal is fully or almost fully depressed.

A further object of the present invention is to provide an engine speed control apparatus for controlling the speed of an engine mounted on a vehicle, capable of smoothly increasing the running speed of the vehicle without unpleasant deceleration due to a sudden drop in the engine speed to idling speed when the vehicle operating at a relatively low running speed is required to accelerate and of limiting the maximum running speed to a predetermined upper limit running speed.

A further object of the present invention is to provide an engine speed control apparatus for controlling the speed of an internal-combustion engine mounted on a vehicle, the apparatus having satisfactory response characteristics and capable of controlling the engine speed for stable operation so that the actual engine speed coincides with a desired engine speed according to the displacement of the accelerator pedal.

A still further object of the present invention is to provide a method of stably controlling the speed of an internal-combustion engine mounted on an industrial vehicle, having improved response characteristics and capable of preventing the internal-combustion engine from stalling even if the internal-combustion engine is unduly loaded during an idling operation.

To achieve the foregoing objects, the present invention provides an engine speed control apparatus for controlling the engine speed of an engine mounted on a vehicle, comprising:

an actuator means for operating the throttle valve of the engine;

an engine speed detecting means for detecting the engine speed of the engine;

an accelerator detecting means for detecting the depression displacement of an accelerator pedal of the vehicle;

a desired engine speed setting means for storing desired engine speeds corresponding, respectively, to displacements of the accelerator pedal and setting a desired engine speed;

an upper limit engine speed setting means for setting the maximum desired engine speed among the desired engine speeds stored and set by the desired engine speed setting means to at least one upper limit engine speed not higher than the maximum idling speed of the engine, taking into consideration conditions under which the vehicle runs; and a control means having an arithmetic means for calculating the deviation of an actual engine speed detected by the engine speed detecting means from a desired engine speed corresponding to a depression displacement of the accelerator pedal detected by the accelerator detecting means when the engine is operating at an engine speed below an upper limit engine speed set by the upper limit engine speed setting means, and capable of making the actual engine speed coincide with the desired engine speed set by the desired engine speed setting means by controlling the actuator means according to the calculated deviation.

Preferably, the upper limit engine speed setting means is connected to the control means and is capable of variably setting a plurality of values indicating maximum engine speeds not higher than the maximum idling speed of the engine.

Preferably, the engine speed control system for controlling the engine speed of an engine mounted on a vehicle further comprises a running speed detecting means for detecting the running speed of the vehicle; the upper limit engine speed setting means is connected to the control means and comprises a maximum running speed setting means for setting at least one maximum running speed, and a storage means provided for the control means for storing a desired upper limit engine speed corresponding to the maximum running speed set by the maximum running speed setting means; the control means comprises a first control means that reads the desired engine speed corresponding to a value detected by the accelerator detecting means from the desired engine speed setting means when the running speed of the vehicle detected by the running speed detecting means is not higher than the maximum running speed set by the maximum running speed setting means, and controls the opening of the throttle valve through the actuator means so that the engine speed coincides with the desired engine speed read from the desired engine speed setting means, and a second control means that reads the upper limit desired engine speed corresponding to the maximum running speed set by the maximum running speed setting means from the storage means when the running speed of the vehicle reaches the maximum running speed set by the maximum running speed setting means, and controls the opening of the throttle valve through the actuator means so that the engine speed coincides with the upper limit desired engine speed read from the storage means.

BRIEF DESCRIPTION OF THE DRAWINGS

The above and other objects, features and advantages of the present invention will be described hereinafter with reference to the accompanying drawings, in which.

BEST MODE OF CARRYING OUT THE INVENTION

Figure 1:
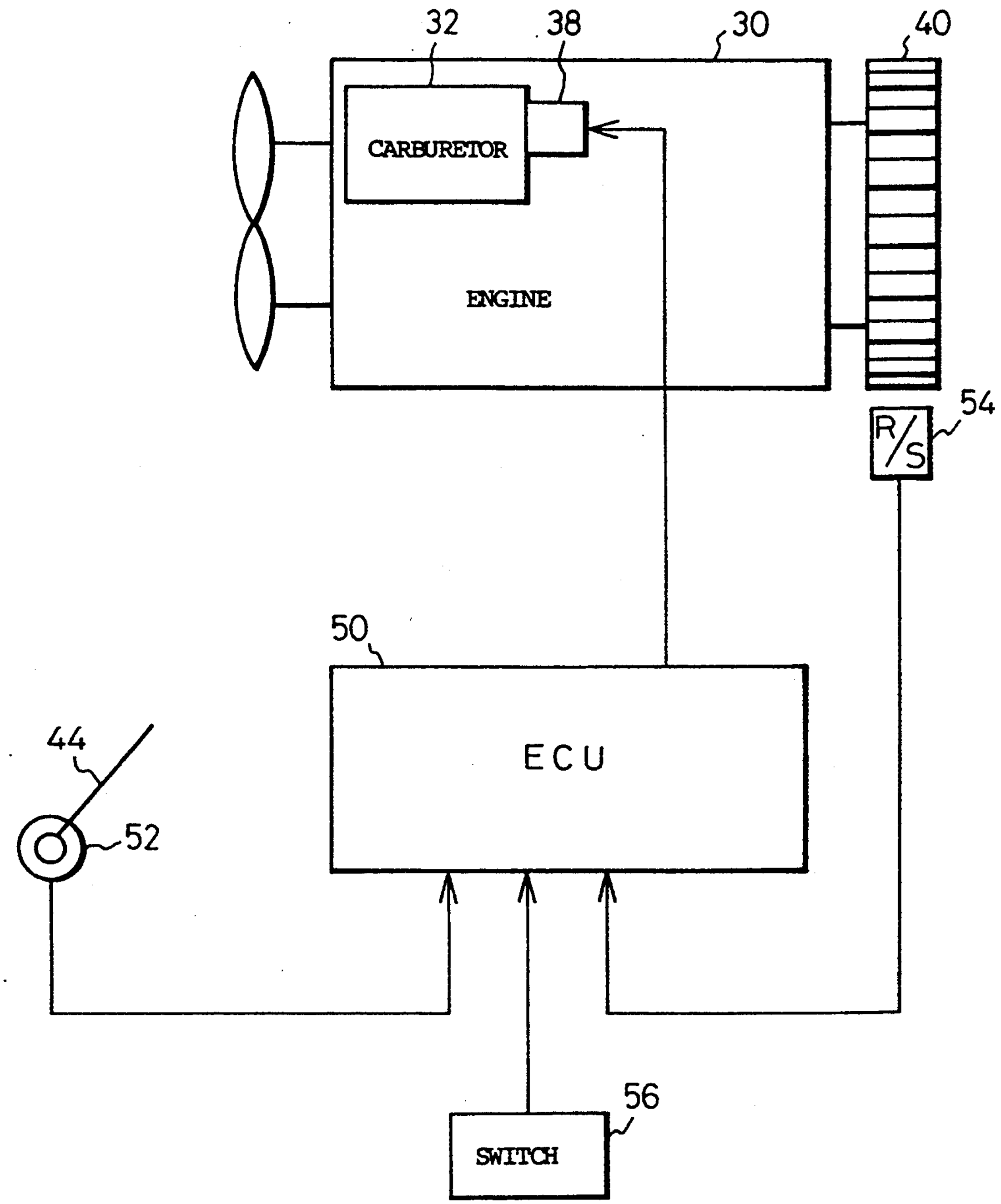
FIG. 1 is a block diagram of an engine speed control apparatus in a first embodiment according to the present invention for controlling the engine speed of an automotive engine mounted on a vehicle.

In the following description of the preferred embodiments of the present invention, the basic components of an internal-combustion engine, such as a gasoline engine or a diesel engine, applicable to an industrial vehicle, such as a forklift truck or a work transfer car, a carburetor incorporated into the internal-combustion engine, a throttle valve incorporated into the carburetor, a flywheel directly connected to the internal-combustion engine, a differential gear mounted on the vehicle, a transmission for transmitting the output power of the internal-combustion engine to the differential gear, and an accelerator pedal of the vehicle are denoted, respectively, by reference characters.

Referring to FIG. 1, an actuator 38 is attached to a carburetor 32 mounted on an engine 30. The actuator 38 is controlled by a signal given thereto from an ECU (electronic control unit) 50 to operate the throttle valve, not shown, of the carburetor 32.

An accelerator pedal displacement detector 52 detects the depression displacement of the accelerator pedal 44 of the vehicle and gives a pedal position detection signal to the ECU 50. Then, the ECU 50 sets a desired engine speed corresponding to the displacement of the accelerator pedal 44. A map of displacements for the accelerator pedal 44 and corresponding desired engine speeds are stored beforehand in a memory means, not shown, provided in the ECU 50 and an engine speed corresponding to the displacement of the accelerator pedal 44 is read from the map. The deviation of an actual engine speed from the desired engine speed is calculated by the ECU 50 where actual engine speed is determined by processing an engine speed detection signal provided by an engine speed detector 54, which, for example, detects the rotating speed of the flywheel 40 directly connected to the output shaft of the engine 30. The arithmetic means, not shown, of the ECU 50 then performs a PID calculation to make the actual engine speed coincide with the desired engine speed, and the actuator 38 is controlled according to the result of the PID calculation so as to control the opening of the throttle valve.

When an engine speed limiting switch 56 connected to the ECU 50 is in an off-state, the engine speed varies between an idling speed and a NMR (no-load maximum revolving speed) according to the displacement of the accelerator pedal 44. When the engine speed limiting switch 56 is in an on-state, a maximum engine speed for the engine 30 is limited to a predetermined upper limit engine speed and the maximum running speed of the vehicle is limited to a predetermined upper limit running speed regardless of the displacement of the accelerator pedal 44.

Figure 2:
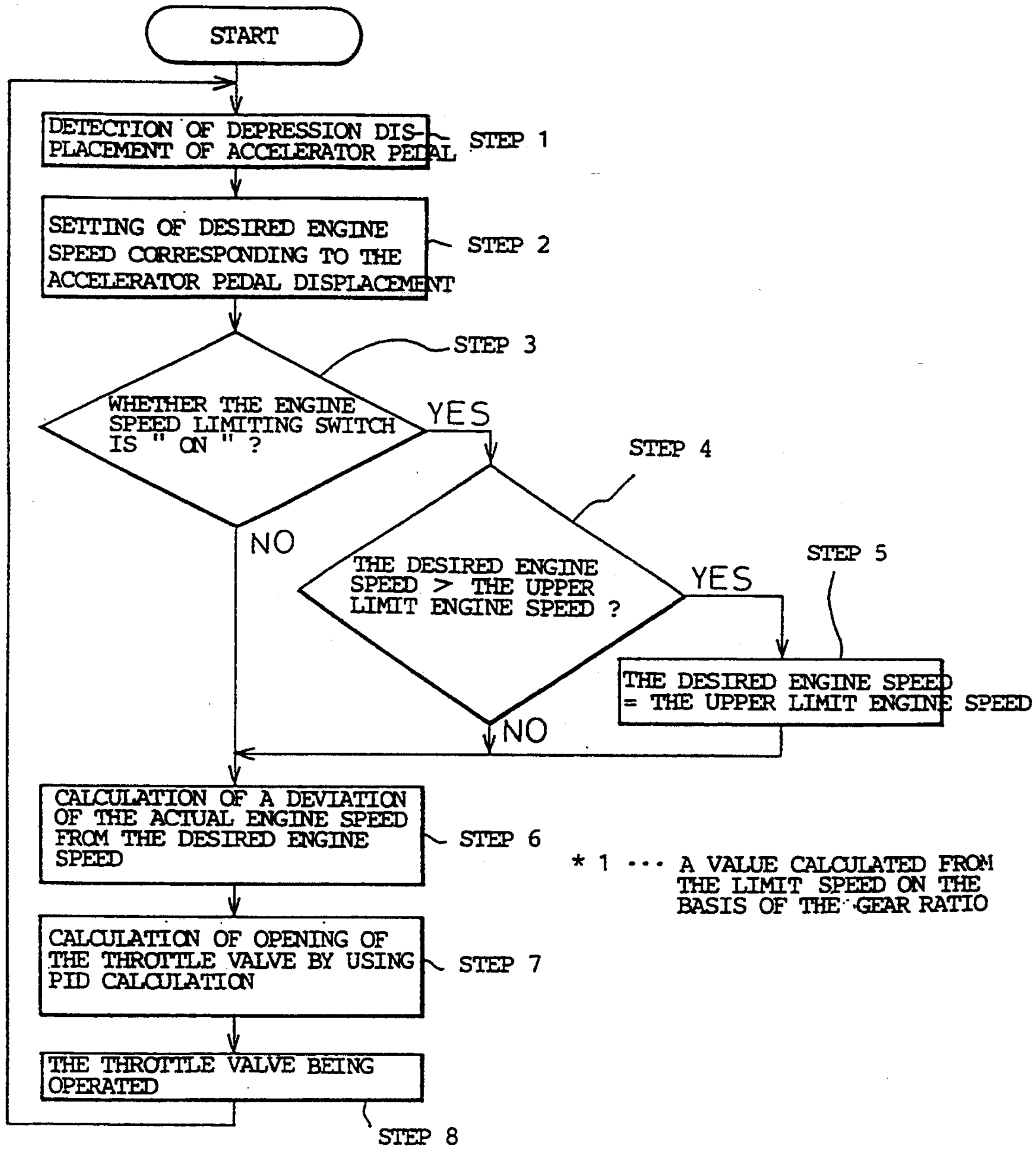
FIG. 2 is a flow chart of a control routine executed by the engine speed control apparatus of FIG. 1 when controlling the engine speed of the automotive engine.

FIG. 2 is a flow chart of an engine speed control routine to be carried out by the foregoing arrangement.

Referring to FIG. 2, the angular displacement of the accelerator pedal 44 is detected by the accelerator pedal displacement detector 52 in step 1. In step 2, the ECU 50 sets a desired engine speed corresponding to the displacement of the accelerator pedal 44. In step 3, a query is made to determine if the engine speed limiting switch 56 is in an on state. If the response in step 3 is affirmative, a query is made in step 4 to determine if the desired engine speed is higher than an upper limit engine speed calculated from the upper limit running speed and the gear ratio of the power transmission system. If the response in step 4 is affirmative, i.e., if the desired engine speed is higher than the calculated upper limit engine speed, the set desired engine speed is reduced to the upper limit engine speed in step 5. Then, in step 6, the deviation of the actual engine speed from the desired engine speed is calculated, an opening of the throttle valve is calculated by a PID calculation using the calculated deviation in step 7, and then, in step 8, the throttle valve is operated by the actuator 38 so that the engine operates at a predetermined engine speed.

Thus, the engine speed limiting switch 56 is set beforehand so that the highest running speed of the industrial vehicle is limited to the prescribed upper limit running speed when the industrial vehicle runs under prescribed running conditions, for example, when operating on specific terrain for yard operation or when operating at night, and the engine speed limiting switch 56 is turned on when the vehicle runs under such prescribed running conditions, thereby limiting the highest running speed automatically, regardless of the displacement of the accelerator pedal 44. Accordingly, the vehicle can be easily and safely maneuvered, and when the vehicle runs outside the specific terrain, the engine speed limiting switch 56 is turned off, and speed can be increased to the NMR and the running speed of the vehicle can be optionally controlled for efficient running.

An engine speed control apparatus of a second embodiment according to the present invention will be described hereinafter. In the engine speed control apparatus in the first embodiment, the upper limit engine speed is fixed by the engine speed limiting switch 56 whereas the engine speed control apparatus in the second embodiment enables the upper limit running speed to change according to specific running conditions for the vehicle, such as when the vehicle operates on specific terrain or at night.

Figure 4:
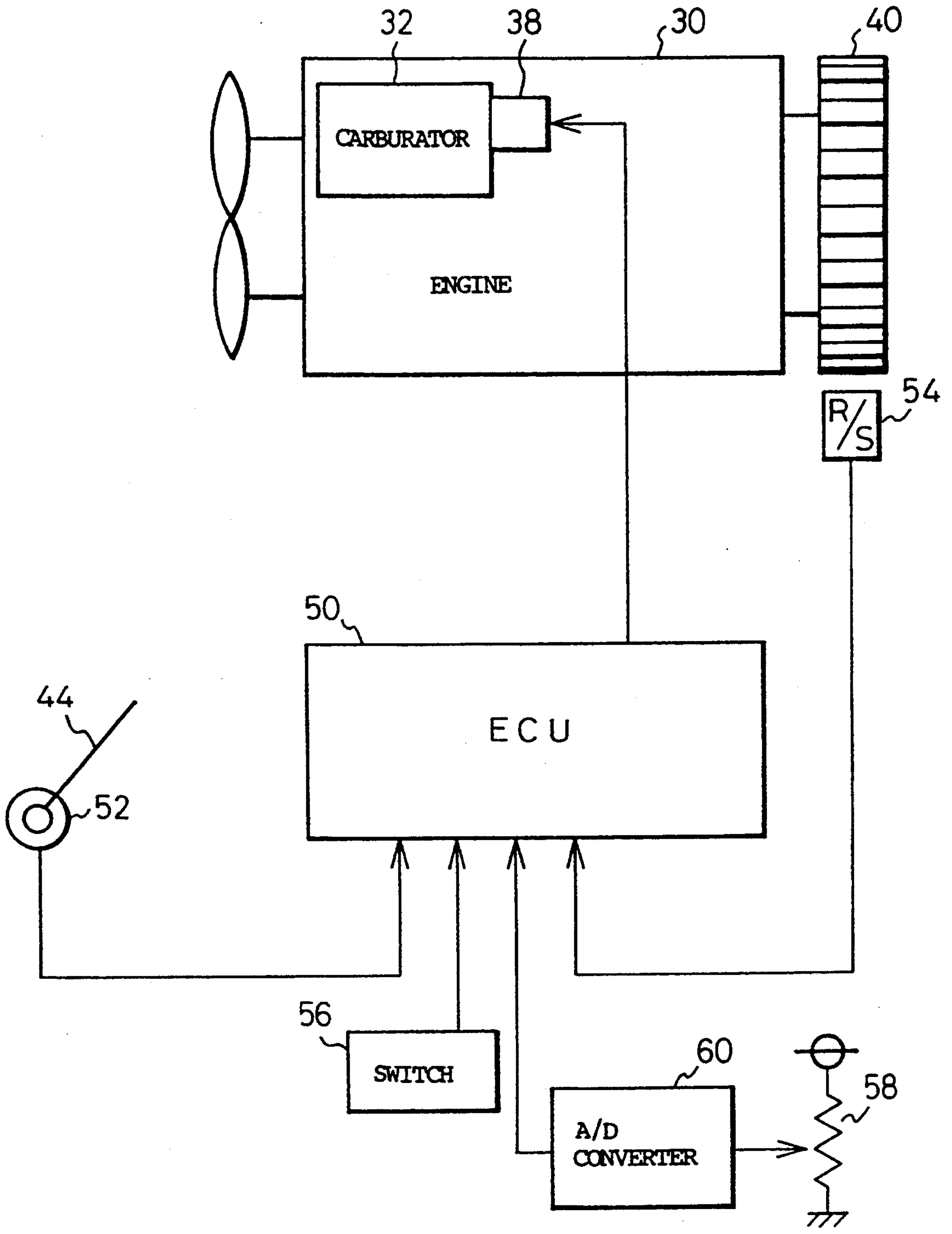
FIG. 4 is a block diagram of an engine speed control apparatus in a second embodiment according to the present invention for controlling the engine speed of an auto e engine mounted on a vehicle.

FIG. 4 shows the engine speed control apparatus in the second embodiment. This engine speed control apparatus is provided, in addition to the components of the engine speed control apparatus in the first embodiment, with an A/D converter 60 connected to the ECU 50, and an electrical maximum engine speed setting device 58 connected to the A/D converter 60.

Figure 3:
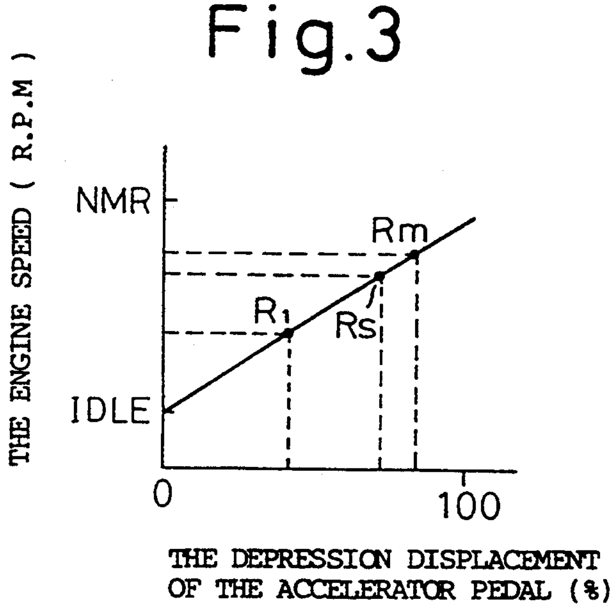
FIG. 3 is a graph showing the relation between the engine speed and the depression displacement of the accelerator pedal of the vehicle.

FIG. 3 shows the relation between engine speed and the displacement of the accelerator pedal.

In the engine speed control apparatus in the first embodiment, the engine speed is set, for example, at a fixed engine speed Rs lower than the NMR when the engine speed limiting switch 56 is in the on-state. The engine speed control apparatus in the second embodiment shown in FIG. 4 enables the engine speed to be set at a speed among stepped engine speeds, for example, in the range from engine speed $R_1$ to engine speed Rm (FIG. 3) by means of the electrical maximum engine speed setting device 58, such as a variable resistor.

The engine speed limiting switch 56 and the maximum engine speed setting device 58 are arranged on the instrument board of the vehicle. A voltage set by the electrical maximum engine speed setting device 58 is applied to the A/D converter 60, and then the A/D converter 60 gives a 0–255 step 8-bit digital signal proportional to the voltage to the ECU 50.

Figure 5:
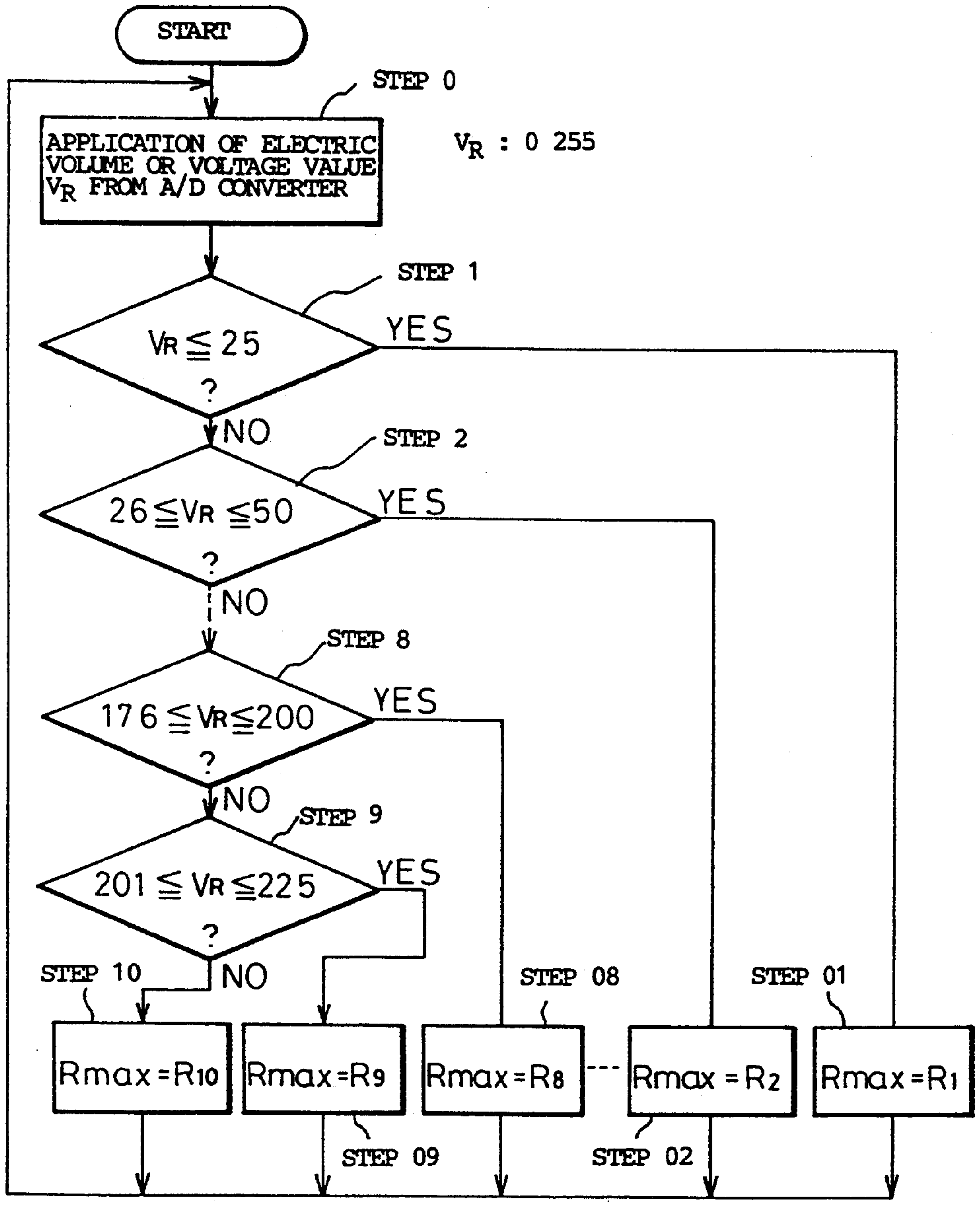
FIG. 5 is a flow chart of a maximum engine speed setting routine to be executed by the engine speed control apparatus of FIG. 4.

FIG. 5 is a flow chart of a maximum engine speed setting routine to be executed by the engine speed control apparatus of FIG. 4 for setting a maximum engine speed $R_{max}$ among, for example, ten stepped maximum engine speeds.

Referring to FIG. 5, the A/D converter 60 gives a voltage signal $V_R$ ($V_R$; 0 to 255) to the ECU 50 in step 0. If the response to a query, $V_R \leqq 25$? in step 1 is affirmative, $R_{max}$ is set to $R_1$ in Step 01. In the response to a query, $26 \leqq V_R \leqq 50$? in step 2 is affirmative, $R_{max}$ is set to $R_2$ in step 02. The description of steps 3 to 7 is omitted. If the response to a query, $176 \leqq V_R \leqq 200 \rightarrow$ in step 8 is affirmative, $R_{max}$ is set to $R_8$ in step 08. If the response to a query, $201 \leqq V_R \leqq 225$? in step 9 is affirmative $R_{max}$ is set to $R_9$ in step 09. If the response in step 9 is negative, $R_{max}$ is set to $R_{10}$ in step 10 Thus, the maximum engine speed $R_{max}$ is determined. For example, when controlling the engine of a forklift truck, an engine speed range of 1,300 rpm to NMR (about 2,950 rpm) is divided into ten steps to set values for the maximum engine speed $R_{max}$. The number of steps of the values for the maximum engine speed $R_{max}$ is not necessarily limited to ten as shown in FIG. 5; for example, the range of 0 to 255 may be divided into 255 steps.

Since the engine speed control apparatus described with reference to FIGS. 4 and 5 is capable of changing the maximum engine speed by means of the electrical maximum engine speed setting device 58, it is possible to change the upper limit running speed of the vehicle. Accordingly, the upper limit running speed can be selectively changed in steps according to conditions when the vehicle operates on specific terrain or at night.

Thus, the vehicle can be operated safely at a suitable running speed.

As is apparent from the foregoing description, the maximum running speed of the vehicle can be as suredly and automatically limited by setting the engine speed limiting switch 56 in the on-state or by setting an appropriate maximum engine speed by means of the maximum engine speed setting device 58 regardless of the displacement of the accelerator pedal, whereby problems in operating an industrial vehicle, such as a forklift truck, on specific terrain or at night, in particular, are eliminated and safety during the operation of the industrial vehicle is enhanced. Moreover, the running speed can be increased to NMR for operating in unrestricted locations by turning the engine speed limiting switch 56 off. Thus, the operating conditions of the vehicle can be determined according to the terrain on which the vehicle operates and, consequently, the performance of the vehicle can be improved.

An engine speed control apparatus in a third embodiment according to the present invention will be described hereinafter. This engine speed control apparatus enhances the accessibility of the accelerator pedal.

Figure 6:
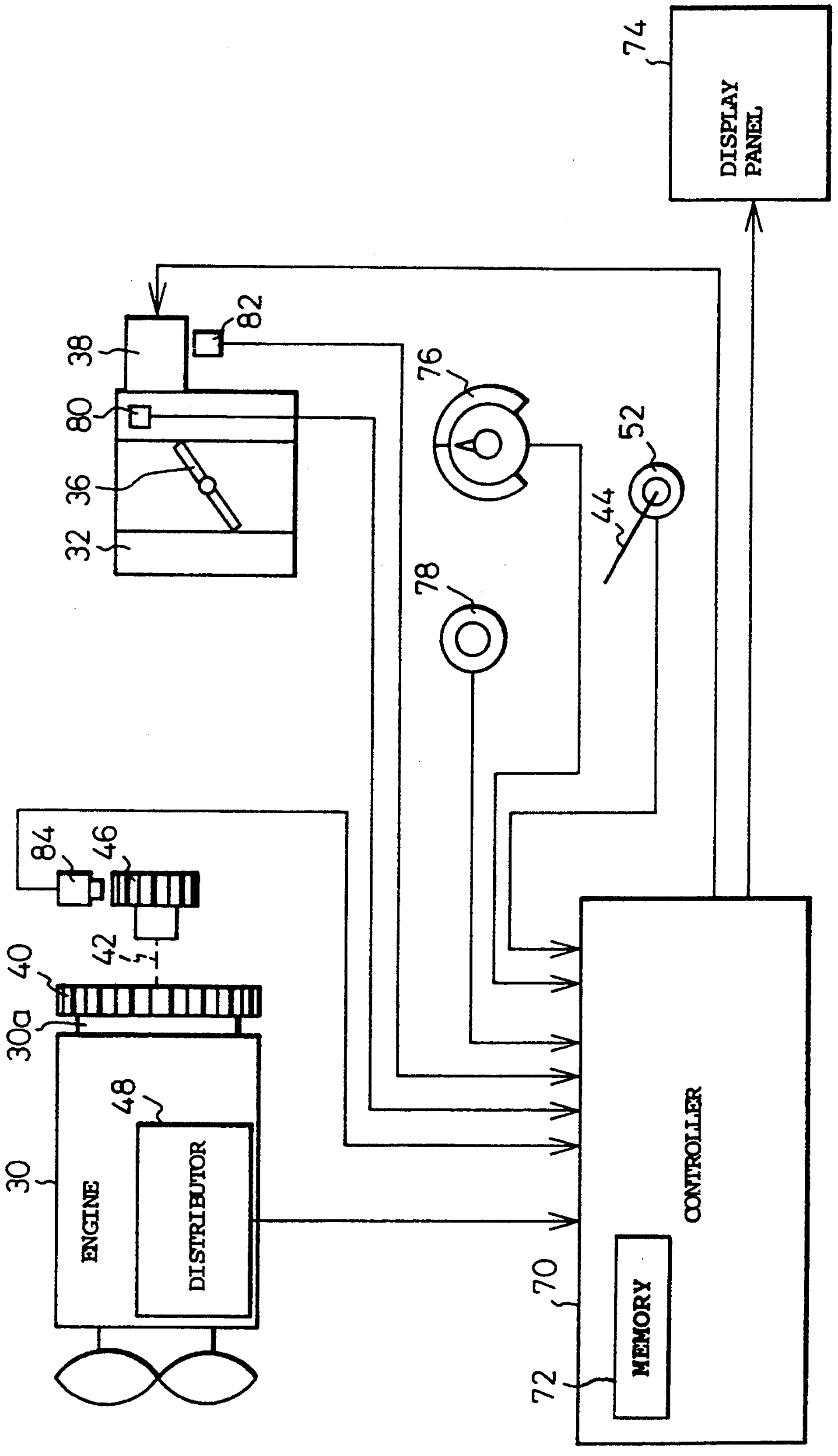
FIG. 6 is a block diagram of an engine speed control apparatus in a third embodiment according to the present invention for controlling the engine speed of an automotive engine mounted on a vehicle.

Referring to FIG. 6, a flywheel 40 is mounted on the output shaft 30*a* of an engine 30 and connected through a clutch mechanism, not shown, and a transmission 42 to a differential gear 46. A carburetor 32 is provided on the intake passage of the engine 30. The carburetor 32 is provided with a swingable throttle valve 36 for regulating the flow rate of intake air. The opening of the throttle valve 36 is controlled by a throttle valve operating means (hereinafter referred an "actuator") 38 including a driving means, such as a stepping motor.

The carburetor 32 is provided with a fully closed position detecting switch 80 for detecting a fully closed position of the throttle valve 36 and a fully open position detecting switch 82 for detecting a fully open position of the throttle valve 36. Detection signals provided by the fully closed position detecting switch 80 and the fully open position detecting switch 82 are given to a controller or control unit 70 serving as a control means included in the engine speed control system.

The control unit 70, comprising a known microcomputer, receives a detection signal provided by an accelerator pedal displacement detector 52 comprising a potentiometer for detecting the displacement of the accelerator pedal 44, and a detection signal provided by a running speed detector 84 for detecting the rotating speed of the differential gear 46, i.e., the running speed of the vehicle. The control unit 70 receives the detection signal representing a displacement of the accelerator pedal 44 from the accelerator pedal displacement detector 52 and drives the actuator 38 according to the detection signal provided by the accelerator pedal displacement detector 52 for regulating the opening of the throttle valve 36 for acceleration or deceleration. The control unit 70 may be provided with a display panel 74 for displaying the operating condition of the vehicle.

An electrical maximum running speed setting device 76, i.e., a maximum running speed setting means for setting a maximum running speed, is connected to the control unit 70 for limiting the running speed of the vehicle to a set maximum running speed even if the accelerator pedal 44 is depressed to an excessive degree. In this embodiment, a maximum running speed set by the maximum running speed setting device 76 is in the range of 9 to 18 km/hr for industrial vehicles.

The control unit 70 is provided with a mode selector switch 78 for selecting either a first mode, in which the maximum running speed set by the maximum running speed setting device 76 is effective or a second mode in which the same maximum running speed is ineffective. The engine 30 is provided with a distributor 48 serving as an engine speed detecting means. The control unit 70 determines the current actual engine speed from the output signal of the distributor 48.

Figure 7:
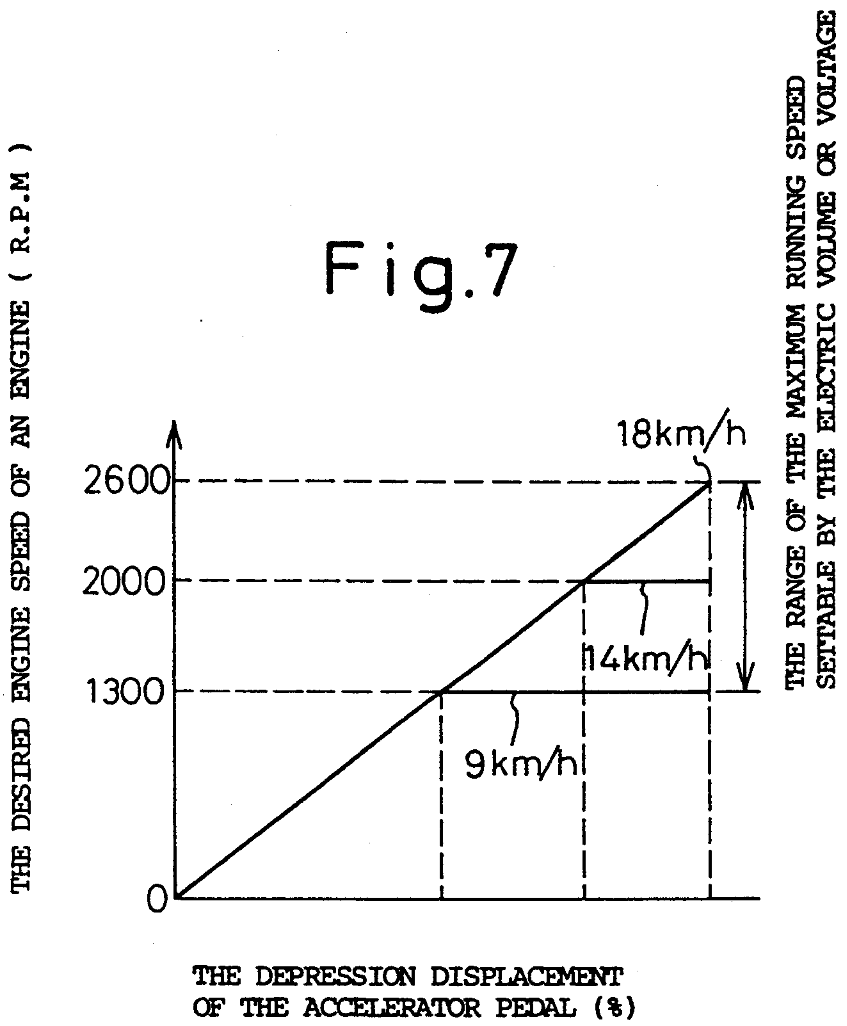
FIG. 7 is a graph showing the relation between the displacement of the accelerator pedal of the vehicle stored in a memory included in the engine speed control system of FIG. 6 and desired engine speed.

The control unit 70 is provided with a memory 72, which stores a map as shown in FIG. 7 indicating the relation between the displacement of the accelerator pedal 44 and the desired engine speed, and maximum running speeds set by the maximum running speed setting device 76 and corresponding to upper limit desired engine speeds. In this embodiment, the running speed varies in proportion to the engine speed of the engine 30 and the proportional constant is determined so that the engine speed is about 1,300 rpm for a running speed of 9 km/hr, and about 2,600 rpm for 18 km/hr.

Accordingly, for example, the control unit 70 reads a desired engine speed for the engine 30 corresponding to a displacement of the accelerator pedal 44 from the memory 72 until the running speed reaches 9 km/hr if a maximum running speed of 9 km/hr is selected by the maximum running speed setting device 76. The control unit 70 compares the actual engine speed of the engine 30 determined from a detection signal provided by the distributor 48 and a desired engine speed read from the memory 72, and controls the actuator 38 to regulate the opening of the throttle valve 36 so that the actual engine speed coincides with the desired engine speed.

After the running speed has reached 9 km/hr, the control unit 70 reads an engine speed for holding the maximum running speed at 9 km/hr regardless of the displacement of the accelerator pedal 44 from the memory 72. Since an engine speed for the maximum running speed of 9 km/hr is 1300 rpm, the control unit 70 controls the actuator 38 so as to adjust the opening of the throttle valve 36 so that the actual engine speed of the engine 30 determined from the detection signal provided by the distributor 48 coincides with 1,300 rpm.

The operation of the engine speed control apparatus thus constructed will be described hereinafter.

The first mode, in which a maximum running speed set by the electrical maximum running speed setting device 76 is effective, is selected by the mode selector switch 78.

Then, the maximum running speed is set to 14 km/hr corresponding to an engine speed of about 2,000 rpm by the maximum running speed setting device 76.

When the accelerator pedal 44 is depressed in this state for accelerating the vehicle, the accelerator pedal displacement detector 52 provides a detection signal representing the displacement of the accelerator pedal 44 to the control unit 70. The control unit 70 reads a desired engine speed for the engine 30 corresponding to the detection signal from the memory 72, compares the current actual engine speed of the engine 30 determined from a detection signal provided by the distributor 48 and the desired engine speed for the engine 30 read from the memory 72 and controls the actuator 38 so as to adjust the opening of the throttle valve 36 such that the actual engine speed coincides with the desired engine speed for accelerating the vehicle.

On the other hand, the control unit 70 determines the running speed of the vehicle from the rotating speed of the differential gear 46 detected by the running speed detector 84 and compares the running speed and the maximum running speed of 14 km/hr to determine if the running speed is higher than the maximum running speed. If the running speed is lower than 14 km/hr, the control unit 70 reads a desired engine speed for the engine 30 corresponding to the detection signal representing the displacement of the accelerator pedal 44 and provided by the accelerator pedal displacement detector 52.

The control unit 70 compares the current actual engine speed of the engine 30 determined from the detection signal provided by the distributor 48 and the desired engine speed of the engine 30 read from the memory 72 and controls the actuator 38 so as to adjust the opening of the throttle valve 36 such that the actual engine speed of the engine 30 coincides with the desired engine speed.

Upon receipt of the decision, on the basis of the rotating speed of the differential gear 46 detected by the running speed detector 84, that the running speed has reached 14 km/hr, the control unit 70 reads an upper limit desired engine speed for the engine 30 corresponding to the maximum running speed set by the maximum running speed setting device 76 regardless of the detection signal representing the displacement of the accelerator pedal 44 provided by the accelerator pedal displacement detector 52.

Since the upper limit desired engine speed for the engine 30 is about 2,000 rpm for the maximum running speed of 14 km/hr in this case, the control unit 70 compares the current actual engine speed of the engine determined from the detection signal provided by the distributor 48 and the upper limit desired engine speed for the engine 30 read from the memory 72, controls the actuator 38 so as to adjust the opening of the throttle valve 36 such that the actual engine speed coincides with the upper limit desired engine speed, and adjusts the engine speed of the engine 30 to 2,000 rpm. Consequently, the running speed is held at 14 km/hr.

When the running speed detected by the running speed detector 84 is not higher than 14 km/hr, the control unit 70 reads a desired engine speed for the engine 30 corresponding to a detection signal representing the displacement of the accelerator pedal 44 from the memory 72, compares the current actual engine speed of the engine determined from a detection signal provided by the distributor 48 and the desired engine speed for the engine 30 read from the memory 72, and controls the actuator so as to adjust the opening of the throttle valve 36 such that the actual engine speed coincides with the desired engine speed. Accordingly, the engine speed is held continuously at an appropriate desired engine speed even if the accelerator pedal 44 is depressed further for acceleration, because the control unit 70 controls the actuator 38 so as to adjust the opening of the throttle valve 36 such that the running speed coincides with the preset maximum running speed. Thus, the engine speed is not reduced suddenly to idling speed even if the running speed exceeds a fixed running speed, so that the driver does not experience a shock effect attributable to sharp deceleration. Furthermore, since the accelerator pedal 44 need not be released even if the running speed exceeds the preset maximum running speed, troublesome operation of the accelerator pedal 44 is unnecessary. Moreover, since the running speed is not reduced, the operating efficiency of the industrial vehicle is improved.

Although the engine speed control apparatus has been described using concrete values of a range of maximum running speeds to be set by the maximum running speed setting device to facilitate an understanding of the apparatus these values are not restrictive and may be suitably changed according to a particular purpose.

In the foregoing embodiment, the running speed of the vehicle determined from the rotating speed of the differential gear, and the current actual engine speed of the engine 30 determined from the detection signal provided by the distributor 40 are given to the control unit 70, and the engine speed of the engine 30 is controlled according to the engine speed, the running speed of the vehicle, the displacement of the accelerator pedal 44 and the maximum running speed set by the maximum running speed setting device. However, since the transmission 42 is shifted from the first speed (low-speed range) to the second speed (high-speed range) or vice versa during the operation of the vehicle it is necessary to improve safety measures to prevent an overshoot in which the actual engine speed exceeds the desired engine speed corresponding to the preset maximum running speed owing to a delay in the control operation and the running speed actually exceeds the preset maximum running speed temporarily, when the transmission is shifted from a low-speed range to a high-speed range and the accelerator pedal is fully or nearly fully depressed for acceleration.

An engine speed control apparatus in a third embodiment according to the present invention is capable of meeting such requirements and is described hereinafter.

Since the engine speed control apparatus in the third embodiment is substantially the same in construction as the engine speed control apparatus shown in FIG. 6, the former will be described with reference to FIG. 6 in addition to FIGS. 8 to 10.

It is noted that the engine speed control apparatus in the third embodiment is capable of detecting the operating range of the transmission 42, i.e., the low-speed range or the high-speed range, in addition to the vehicle running speed and the actual running speed of the engine 30, through the cooperative agency of a running speed detector 84 and the distributor 48. The controller 70 decides whether the transmission 42 is set for the low-speed range (first speed) or whether the transmission 42 is set for the high-speed range (second speed) from the ratio between the momentary actual engine speed of the engine 30 detected by the distributor 48 and the running speed detected by the running speed detector 84.

Values for the speed of the engine 30 and values of the vehicle running speed varying in proportion to engine speed are stored in the memory 72 of the control unit 70. Values of the desired engine speed for the engine 30 are determined so that the desired engine speed varies in proportion to the angular displacement of the accelerator pedal 44 and the maximum engine speed of the engine 30, for example, 2,600 rpm, corresponds to the maximum displacement of the accelerator pedal 44. The engine speed of the engine 30 is about 2600 rpm when the running speed of the vehicle is 6.5 km/hr and the transmission of the vehicle is set for a low-speed range.

Figure 10:
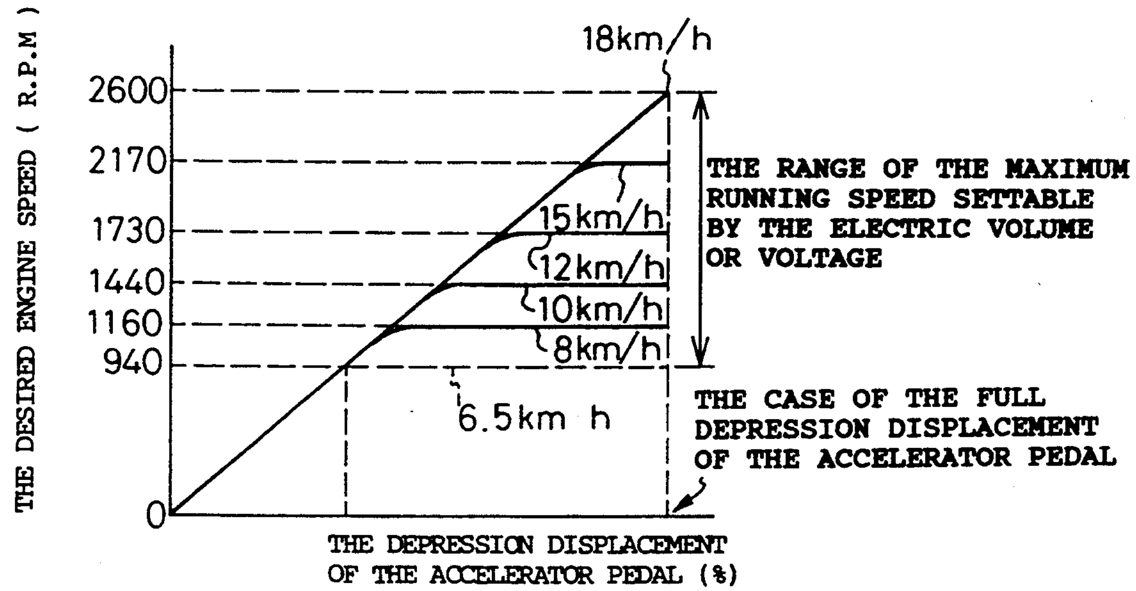
FIG. 10 is a graph showing the relation between the desired engine speed and maximum running speed, set by a maximum engine speed setting device.

A map of displacements of the accelerator pedal 44 and corresponding desired engine speeds of the engine 30, as shown in FIG. 10, for operation with the transmission set for a high-speed range and a map of maximum running speeds to be selected by the maximum running speed setting device 76 and corresponding upper limit desired engine speeds are stored in the memory 72 of the control unit 70. In the latter map, the running speed varies in proportion to the engine speed of the engine 30 in a range where the engine speed is not higher than the upper limit of desired speed, and the desired engine speeds of the engine 30 are determined so that the maximum engine speed, for example, 2,600 rpm, corresponds to the maximum displacement of the accelerator pedal 44.

As shown in FIG. 10, different upper limit desired engine speeds for the engine 30 are determined, respectively, for maximum running speeds to be set by the maximum running speed setting device 76 for running with the accelerator pedal 44 fully depressed. For example, when a maximum running speed of 10 km/hr is set by the maximum running speed setting device 76, the high-speed range is selected and the accelerator pedal 44 is fully depressed, and the upper limit engine speed for the engine 30 is 1,440 rpm.

Figure 9:
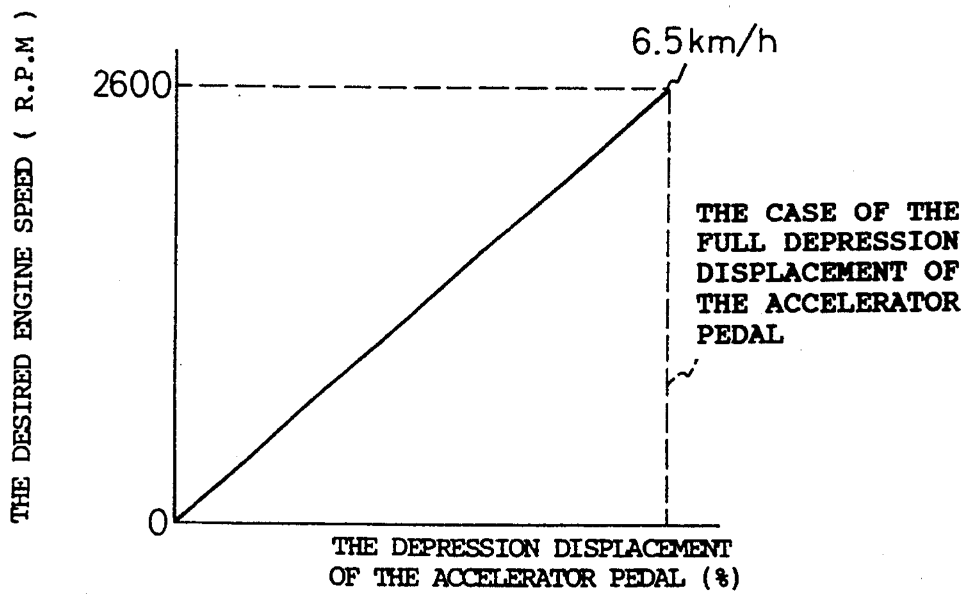
FIG. 9 is a graph showing the relation between the displacement of the accelerator pedal of the vehicle and the engine speed when the transmission system of the vehicle is set to the first speed.

Accordingly, when the accelerator pedal 44 is fully depressed to accelerate the vehicle with the maximum running speed set, for example, to 10 km/hr by the maximum running speed setting device 76 and the vehicle running at a low running speed, a desired engine speed is determined from the map shown in FIG. 9 stored in the memory 72 of the control unit 70, the control unit 70 compares the desired engine speed of the engine 30 read from the memory 72 and the current actual engine speed of the engine determined from a detection signal provided by the distributor 48, and the control unit 70 controls the actuator 38 to regulate the opening of the throttle valve 36 so that the actual engine speed coincides with the desired engine speed.

When the engine speed of the engine 30 coincides with the desired engine speed of 2,600 rpm, the running speed is 6.5 km/hr. If the transmission 42 is shifted from the low-speed range to the high-speed range with the accelerator pedal 44 fully depressed, the shift of the transmission 42 is detected from the ratio of the actual engine speed of the engine 30 detected by the distributor 48 and the running speed detected by the running speed detector 84.

Thus, the control unit 70 decides that the transmission 42 has been shifted from the low-speed range to the high-speed range and the running speed reaches the set running speed (6.5 km/hr) and reads the upper limit desired engine speed (about 1,440 rpm) corresponding to the set maximum running speed shown in FIG. 10 set by the maximum running speed setting device 76 from the memory 72 immediately after the accelerator pedal 44 has been fully depressed.

The control unit 70 compares the current actual engine speed of the engine 30 determined from the detection signal provided by the distributor 48 and the upper limit desired engine speed read from the memory 72, and then controls the actuator 38 so as to regulate the opening of the throttle valve 36 so that the engine speed coincides with the upper limit desired engine speed.

Furthermore, the control unit 70 reads the upper limit desired engine speed of the engine 30 from the map shown in FIG. 10 stored in the memory 72 to hold the preset maximum running speed when the engine speed reaches the upper limit engine speed (1,440 rpm), namely, when the running speed reaches the maximum running speed (10 km/hr) set previously by the maximum running speed setting device 76. The control unit 70 compares the current actual engine speed of the engine 30 determined from the detection signal provided by the distributor 48 and the upper limit desired engine speed for the engine 30 read from the memory 72, and then controls the actuator 38 so as to regulate the opening of the throttle valve 36 such that the actual engine speed coincides with the desired engine speed.

Since the desired engine speed for the engine 30 corresponding to the preset maximum running speed (10 km/hr) is 1,440 rpm in this case, the control unit 70 controls the actuator 38 so as to regulate the opening of the throttle valve 36 such that the actual engine speed of the engine 30 determined from the detection signal provided by the distributor 48 is equal to 1,440 rpm.

The operation of the engine speed control system thus constructed will be described hereinafter.

First, the driver operates the mode selector switch 78 to select the first mode in which a preset maximum running speed set by the maximum running speed setting device 76 is effective. Then, the driver operates the maximum running speed setting device 76 to set a maximum running speed (for example, 10 km/hr which corresponds to an engine speed of about 1,440 rpm).

The accelerator pedal 44 is then fully depressed to accelerate the vehicle with the transmission set for the low-speed range. The accelerator pedal displacement detector 52 detects the angular displacement of the accelerator pedal 44 and gives a detection signal representing the angular displacement of the accelerator pedal 44 to the control unit 70. The control unit 70 reads a desired engine speed for the engine corresponding to the detection signal provided by the accelerator pedal displacement detector 52, i.e., a maximum engine speed of 2,600 rpm in this case, from the map for the low-speed range shown in FIG. 9 from the memory 72. The control unit 70 determines the current actual engine speed of the engine 30 from a detection signal provided by the distributor 48, compares the current actual engine speed and the desired engine speed read from the memory 72 and controls the actuator 38 to regulate the opening of the throttle valve 36 such that the actual engine speed of the engine 30 coincides with the desired engine speed.

Figure 8:
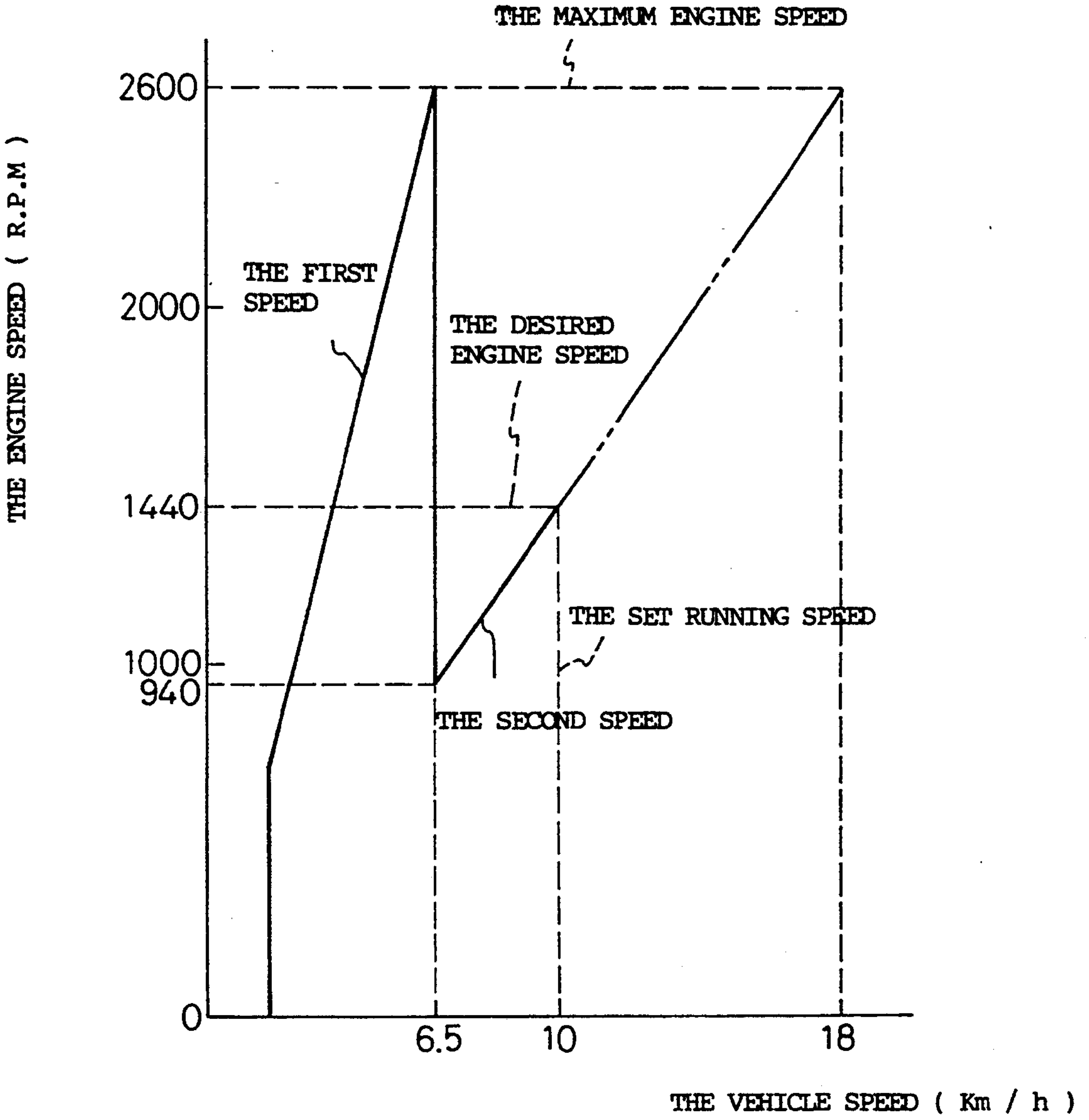
FIG. 8 is a characteristic graph showing the relation between the running speed of the vehicle and the engine speed for the first speed and the second speed of the transmission system of the vehicle.

Consequently, the speed of the engine 30 of the vehicle running with the transmission set for the low-speed range increases along a curve for the first speed shown in FIG. 8 to the maximum engine speed of 2,600 rpm, at which the running speed is 6.5 km/hr as shown in FIG. 8.

When the transmission 42 is shifted from the low-speed range to the high-speed range in this state, the control unit 70 determines the current actual engine speed of the engine 30 from the detection signal provided by the distributor 48 and discerns that the transmission 42 has shifted from the low-speed range to the high-speed range from the ratio between the actual engine speed and the running speed of the vehicle determined from the detection signal provided by the running speed detector 84. The control unit 70 thus discerns that the transmission 42 has shifted from the low-speed range to the high-speed range and, upon the detection of the accelerator pedal 44 being fully or nearly fully depressed, reads an upper limit engine speed (1,440 rpm) for the engine 30 corresponding to a preset maximum running speed (10 km/hr) set by the maximum running speed setting device 76 from the map shown in FIG. 10 stored in the memory 72.

The control unit 70 determines the current actual engine speed of the engine 30 from the detection signal provided by the distributor 48, compares the current actual engine speed and the upper limit desired engine speed (1,440 rpm) read from the memory 72 and controls the actuator 38 to regulate the opening of the throttle valve 36 so that the engine speed of the engine 30 coincides with the upper limit desired engine speed. Consequently, the engine speed increases along a curve for the second speed shown in FIG. 8 after the transmission has been shifted for the high-speed range.

The running speed of the vehicle reaches the preset maximum running speed of 10 km/hr set by means of the maximum running speed setting device 76 when the engine speed of the engine 30 reaches the upper limit desired engine speed (1,440 rpm), and then the control unit 70 controls the engine speed of the engine 30 to maintain this state. That is, when the running speed of the vehicle is increased to the preset maximum running speed of 10 km/hr set by the maximum running speed setting device 76 and the displacement of the accelerator pedal 44 is greater than a certain displacement, the control unit 70 controls the engine 30 so that the engine speed is equal to the upper limit desired engine speed of 1,440 rpm corresponding to the preset maximum running speed as shown in FIG. 8.

When the transmission of the vehicle is shifted from the low-speed range to the high-speed range the control unit 70 controls the engine 30 so that the engine speed coincides with the upper limit desired engine speed corresponding to the preset maximum running speed set by means of the maximum running speed setting device 76. Accordingly, an overshoot, in which the running speed of the vehicle exceeds the preset maximum running speed set by means of the maximum running speed setting device 76, is prevented and the vehicle runs smoothly.

Needless to say, concrete values used in the foregoing description are only for example and are not to be construed as limiting the scope of the invention.

An engine speed control apparatus in a fourth embodiment according to the present invention as applied to controlling a gasoline engine mounted on an industrial vehicle will be described hereinafter. This engine speed control system discriminates between a state where the transmission of the vehicle is set for a low-speed range and a state where the same is set for a high-speed range, and limits the running speed of the vehicle to an upper limit running speed when controlling the engine speed of the vehicle.

Figure 11:
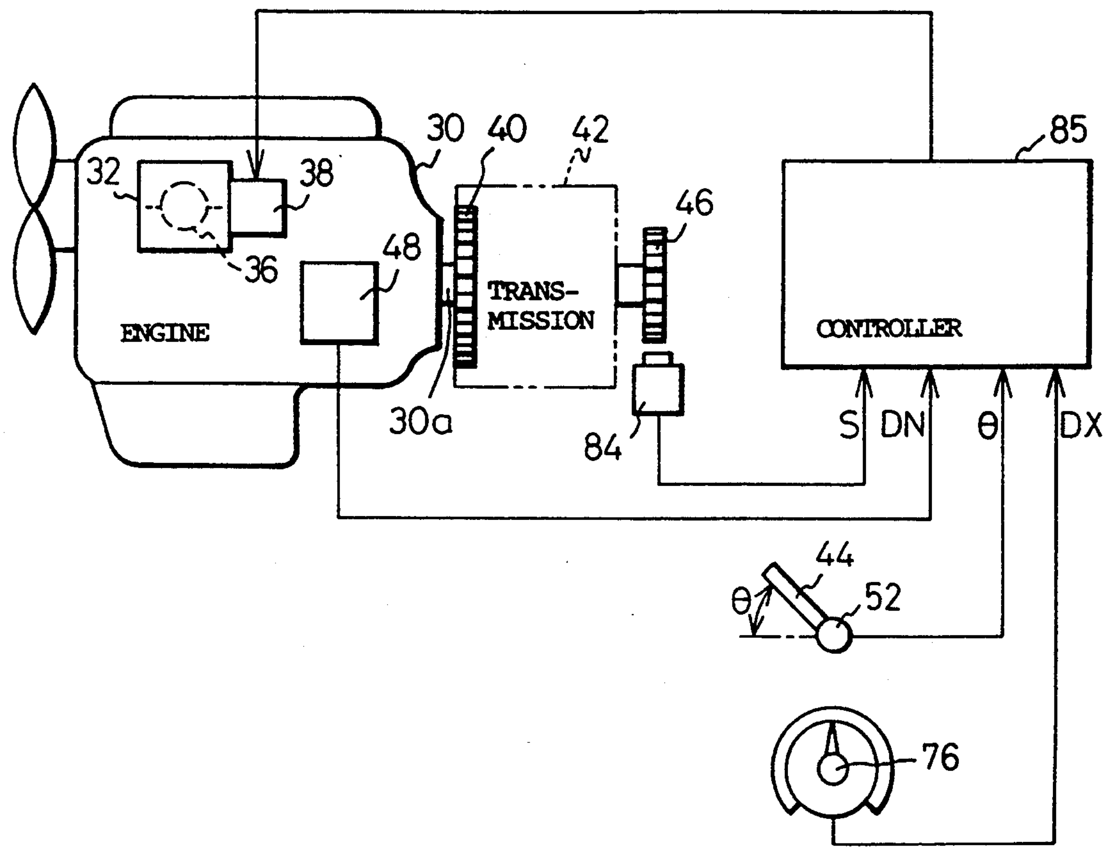
FIG. 11 is a block diagram of an engine speed control apparatus in a fourth embodiment according to the present invention for controlling the engine speed of an automotive gasoline engine mounted on a vehicle.
Figure 12:
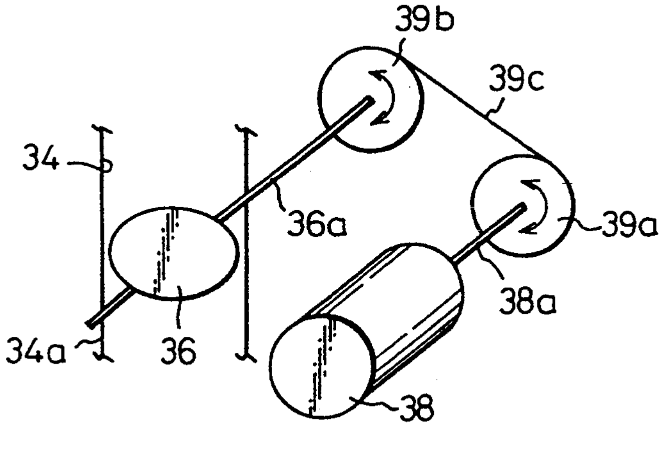
FIG. 12 is a schematic perspective view of a throttle valve operating mechanism provided on an intake passage of the engine speed control apparatus of FIG. 11.

Referring to FIGS. 11 and 12, as is generally known, an engine 30 mounted on an industrial vehicle is used as a prime mover for driving a hydraulic circuit for operating a working mechanism, such as a fork, as well as a prime mover for driving the industrial vehicle for running. An air horn **34*a* pivotally supporting a throttle valve 36 is provided on the intake passage of a carburetor 32 mounted on the engine 30. An actuator 38, such as a stepping motor, is attached to the carburetor 32 to operate the throttle valve 36. As best shown in FIG. 12, the pulley 39*a* mounted on the output shaft 38*a* of the actuator 38 and a pulley 39*b* mounted on the shaft 36*a* of the throttle valve 36 are operatively interlocked by a wire 39*c***.

When the output shaft **38*a* of the actuator 38 is turned through a predetermined angle, the throttle valve 36 is turned accordingly through the pulleys 39*a*, the wire 39*c* and the pulley 39*b***.

The vehicle incorporating the engine speed control apparatus in this embodiment is provided with an accelerator pedal 44 to select a desired engine speed D0 for the engine 30. An angular displacement $\theta$ (angle through which the accelerator pedal is turned) of the accelerator pedal 44 is detected by an accelerator pedal displacement detector 52, i.e., an accelerator pedal displacement detecting means, such as a potentiometer.

The engine speed control apparatus in this embodiment has an electrical upper limit desired engine speed setting device 76, i.e., an upper limit desired engine speed setting means, for setting an upper limit desired engine speed Dx corresponding to a maximum running speed equivalent to the maximum displacement (the maximum angle of turning) for the accelerator pedal 44. The upper limit desired engine speed setting device 76 is capable of setting an upper limit desired engine speed Dx for a maximum running speed in the range of 9 km/hr to 18 km/hr.

A known distributor 48 for timing the ignition of the engine 30, capable of serving also as an engine speed detecting means is also used as an engine speed detecting means to avoid using an engine speed detector specially for detecting the actual engine speed DN of the engine 30. The distributor 48 comprises a rotor, not shown, rotated by the engine 30, and a pickup, not shown, for periodically detecting the rotation of the rotor. The actual engine speed DN is determined from ignition timing signals periodically provided by the distributor 48.

A flywheel 40 is mounted on the output shaft **30*a* of the engine 30 and connected through a transmission 42 to a differential gear 46. A running speed detector 84 for detecting the running speed S of the vehicle 30 from the operating speed of the differential gear 46 is disposed near the differential gear 46**.

A control unit or controller 85, similar to the foregoing control unit 70 internally provided with the memory 72, as shown in FIG. 6, comprises a microcomputer internally provided with a memory. Programs including control programs for controlling engine speed are stored in the memory of the control unit 85. The control unit 85 receives a detection signal representing an angular displacement $\theta$ of the accelerator pedal 44 from the accelerator pedal displacement detector 52 and ignition timing signals representing an actual engine speed DN from the distributor 48. The control unit 85 receives an upper limit desired engine speed Dx set by the upper limit desired engine speed setting device 76 and a detection signal representing a running speed S from the running speed detector 84. The control unit 85 controls the actuator 38 according to those input signals and an engine speed control program. This embodiment uses the distributor 48 and the running speed detector 84 for detecting the speed of the transmission 42 to avoid using a detector specially for detecting the speed of the transmission 42; the control unit 85 identifies the speed of the transmission 42 from an actual engine speed DN determined from the output signal of the distributor 48 and a running speed S determined from the output signal of the running speed detector 84.

Figure 13:
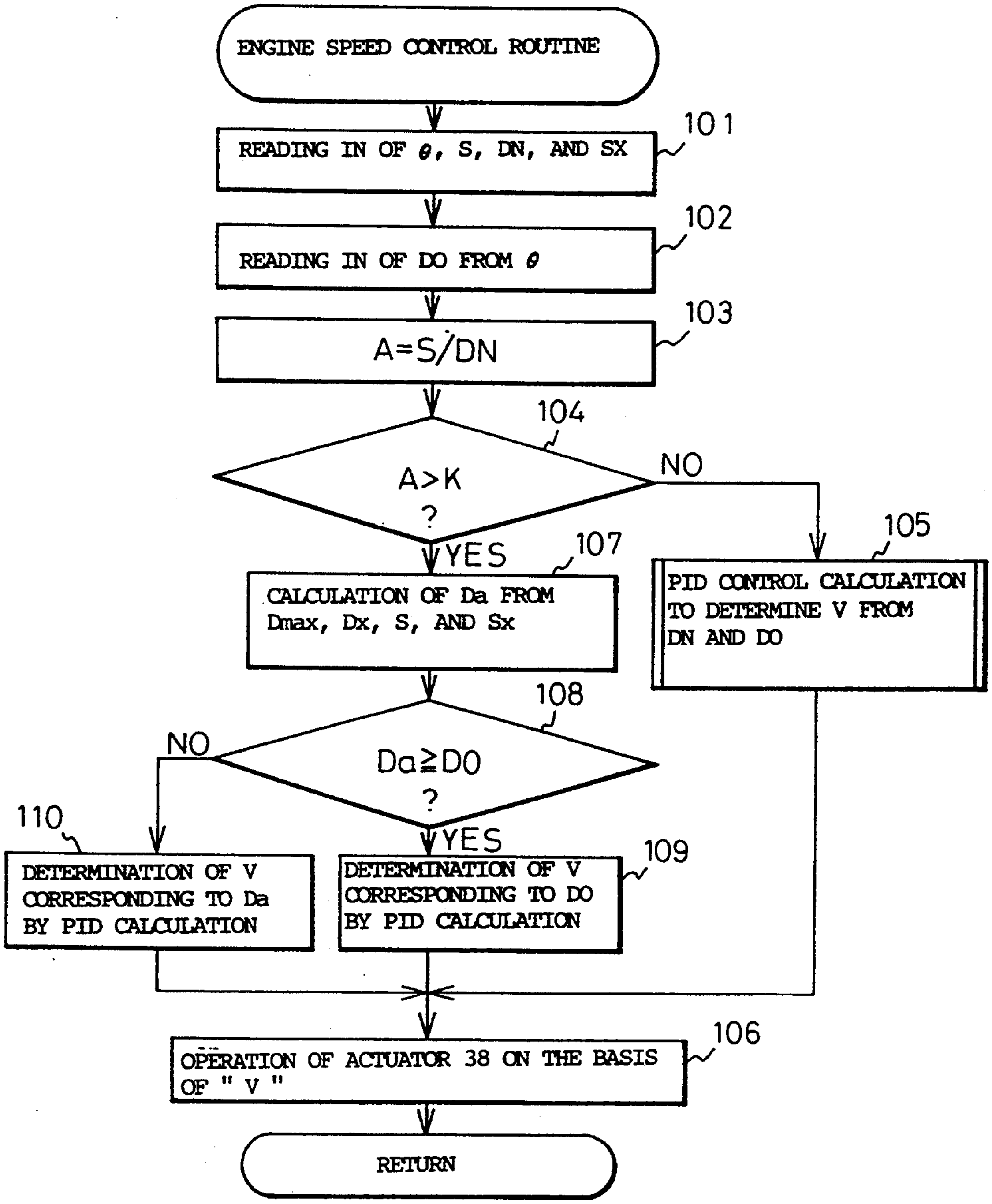
FIG. 13 is a flow chart of an engine speed control routine to be executed by a control unit provided in the engine speed control apparatus of FIG. 11.

The engine speed control apparatus thus constructed so as to control the engine speed of the gasoline engine mounted on the industrial vehicle will be described hereinafter with reference to a flow chart of FIG. 13 showing an engine speed control routine to be executed periodically every 10 msec in a clock interrupt mode.

When the control process is interrupted to execute the engine speed control routine, the control unit 85 receives signals representing an angular displacement $\theta$ of the accelerator pedal 44, a running speed S, an actual engine speed DN and an upper limit desired engine speed Dx, respectively, from the accelerator pedal displacement detector 52, the running speed detector 84, the distributor 48 and the upper limit desired engine speed setting device 76 in step 101.

Then, in step 102, a desired engine speed D0 corresponding to the angular displacement $\theta$ is retrieved from data representing the relation between the angular displacement $\theta$ and the desired engine speed D0, stored beforehand in the memory.

Figure 14:
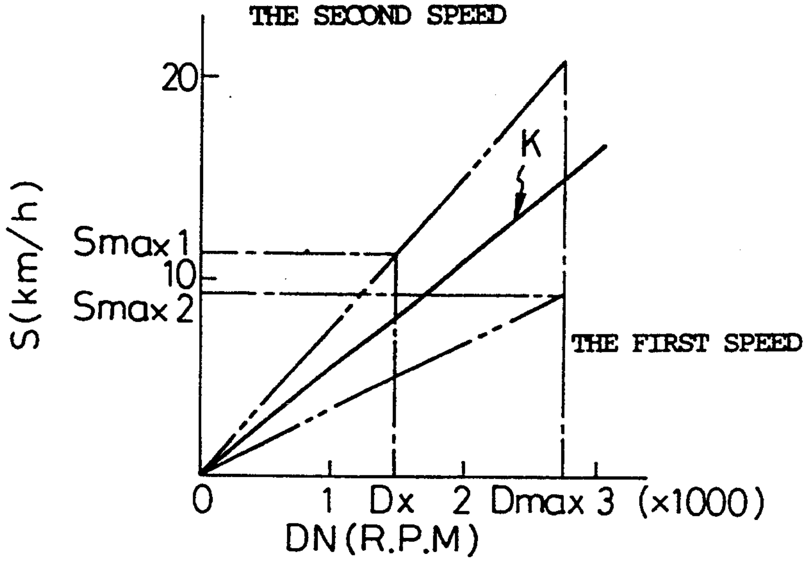
FIG. 14 is a graph explaining the relation between the actual engine speed and the running speed, from which the engine speed control apparatus of FIG. 11 discriminates between a state where the transmission is set for the first speed and a state where the same is set for the second speed.

In step 103, the running speed S is divided by the actual engine speed DN to obtain a speed index A indicating the speed of the transmission 42. In step 104, a query is made to determine if the speed index A is greater than a speed criterion K, i.e., it is determined whether the transmission is set for the first speed or whether the same is set for the second speed from the actual engine speed DN and the running speed S as shown in FIG. 14. If the speed index A is not greater than the speed criterion K, it is decided that the transmission is set for the first speed and the routine goes to step 105.

In step 105, the deviation of the actual engine speed DN from the desired engine speed D0 is calculated and a PID calculation is performed using the calculated deviation to obtain a desired operating quantity V of the actuator 38 corresponding to a desired angular change of the angular displacement of the throttle valve 36. Then, in step 106, the actuator 38 is operated according to the calculated desired operating quantity V to change the angular displacement of the throttle valve 36 by the desired angular change, and the routine is then ended. Thus, the control unit 85 carries out the PID control of the actuator 38 when the transmission 42 is set for the first speed.

If it is decided in step 104 that the speed index A is greater than the speed criterion K, the control unit 85 decides that the transmission 42 is set for the second speed and executes step 107. In step 107, a transient desired engine speed Da is determined from a maximum allowable engine speed $D_{max}$ for the engine 30, the upper limit desired engine speed Dx set by the upper limit desired engine speed setting device 76, the running speed S, and a predetermined maximum allowable running speed Sx for running with the transmission set for the first speed by the following calculation.

$$Da = D_{max} - \{(D_{max} - Dx)/Sx\} * S$$

In step 108, a query is made to determine if the calculated transient desired engine speed Da is not lower than the desired engine speed D0 proportional to the angular displacement $\theta$. If the transient desired engine speed Da is not lower than the desired engine speed D0, a desired operating quantity V of the actuator 38 corresponding to a desired angular change of the angular displacement of the throttle valve 36 for the desired engine speed D0 is determined by a PID calculation in step 109, the actuator 38 is operated by the desired operating quantity V to change the angular displacement of the throttle valve 36 accordingly, and the routine is then ended.

If it is determined in step 108 that the transient desired engine speed Da is lower than the desired engine speed D0, step 110 is executed to determine a desired operating quantity V of the actuator 38 corresponding to a desired angular change of the angular displacement of the throttle valve 36 to set the throttle valve 36 at an angular displacement corresponding to the transient desired engine speed Da by a PID calculation. Step 106 is then executed to operate the actuator 38 according to the calculated desired operating quantity V to change the angular displacement of the throttle valve 36 accordingly, and the routine is then ended. Thus, the control unit 85 determines the transient desired engine speed Da and controls the actuator 38 to limit the actual engine speed DN to the upper limit desired engine speed Dx when the speed of the transmission 42 is changed from the first speed to the second speed.

Since the engine speed control routine for controlling the engine speed of the engine 30 is thus carried out, the actual engine speed DN of the engine 30 and the running speed S varies in the following mode when the accelerator pedal 44 is depressed to its full angular displacement for acceleration while the engine 30 is idling and the transmission 42 is set for the first speed.

Figures 15A, 15B, 15C:
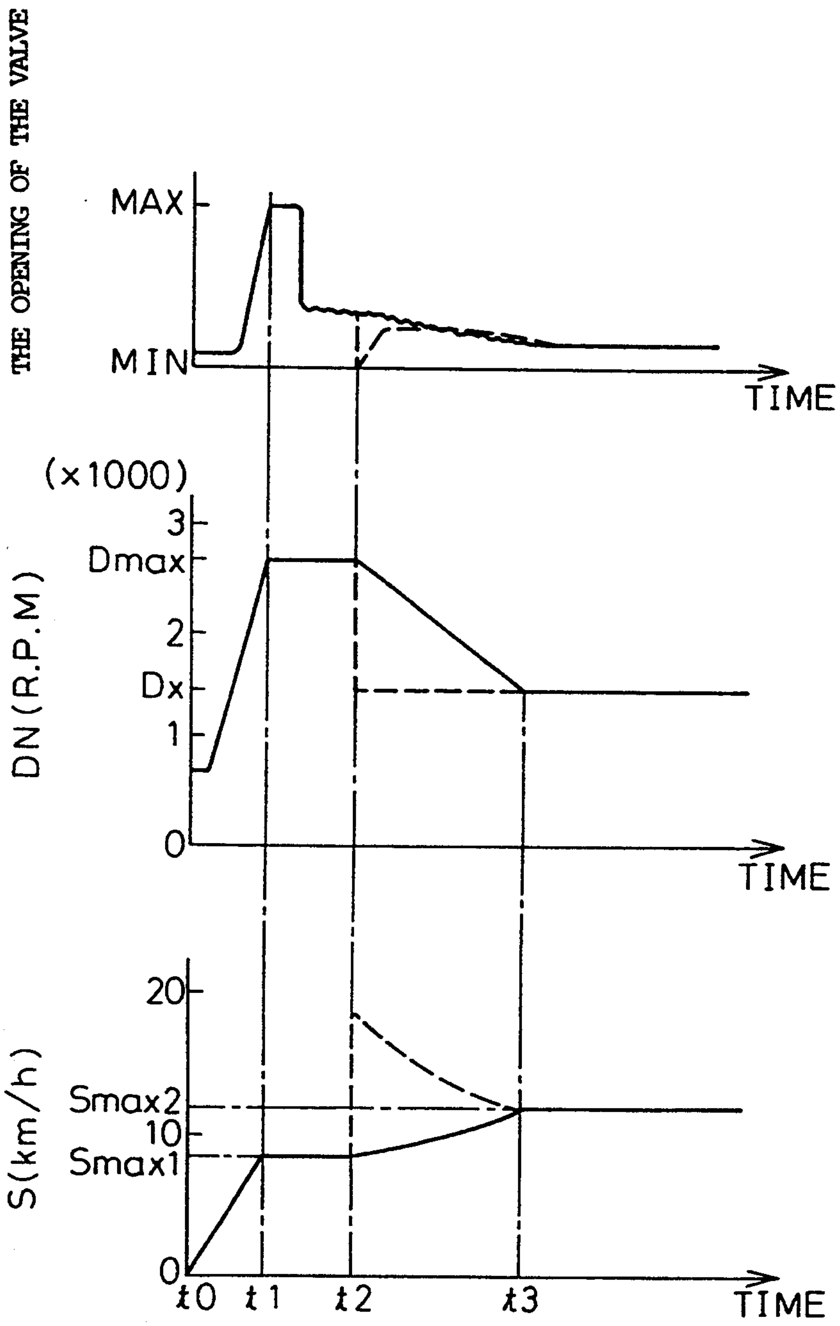
FIGS. 15A to 15C are timing diagrams respectively showing the opening of the throttle valve, the actual engine speed, and variations of the running speed, with time when the engine is controlled by the engine speed control apparatus of FIG. 11.

As is apparent from timing diagrams shown in Figs. 15A to 15C, when the accelerator pedal 44 is depressed at time t0 to turn the accelerator pedal 44 to its full angular displacement, the actual engine speed DN increases sharply with the increase in the angular displacement of the throttle valve 36. When the actual engine speed DN reaches the maximum allowable engine speed $D_{max}$, namely, an upper limit engine speed for the engine 30, at time t1, the engine 30 operates at the maximum allowable engine speed $D_{max}$. Meanwhile, the running speed S increases in proportion to the actual engine speed DN and, finally, reaches a maximum running speed $S_{max1}$ for running with the transmission 42 set for the first speed.

After a while, when the speed of the transmission 42 is changed from the first speed to the second speed at time t2, the actual engine speed DN decreases gradually. Upon the coincidence of the actual engine speed DN with the upper limit desired engine speed Dx set by means of the upper limit desired engine speed setting device 76 at time t3, the engine speed is held at the upper limit engine speed Dx. Meanwhile, the running speed S increases gradually because the transmission 42 is set for the second speed and, finally, the running speed S settles at a theoretical maximum running speed $S_{max2}$ corresponding to the upper limit desired engine speed Dx.

When the transmission 42 is shifted to the second speed at time t2 in FIGS. 15A to 15C, it is theoretically desirable to decrease the actual engine speed DN instantly from the maximum allowable engine speed $D_{max}$ to the upper limit engine speed Dx as indicated by broken lines in FIG. 15B. However, if the actual engine speed DN is decreased rapidly in such a manner, the throttle valve 36 is closed rapidly and temporarily to control the engine speed, and then, the throttle valve 36 is opened gradually until the actual engine speed DN increases to the upper limit engine speed Dx. Such a mode of operation of the throttle valve 36 is equivalent to a sharp application of engine brake and subsequent acceleration. Theoretically, the running speed S is expected to increase sharply at time t2 as indicated by a broken line in FIG. 15C when the speed of the transmission 42 is changed from the first speed to the second speed.

The engine speed control apparatus in this embodiment allows the actual engine speed DN to increase to the maximum allowable engine speed $D_{max}$ when the accelerator pedal 44 is depressed to its maximum angular displacement for acceleration with the transmission 42 set for the first speed. When the speed of the transmission 42 is changed from the first speed to the second speed, the actual engine speed DN is lowered gradually from the maximum allowable engine speed $D_{max}$ via the transient desired engine speed Da to the upper limit desired engine speed Dx.

Accordingly, the actual engine speed DN can be increased to the maximum allowable engine speed $D_{max}$ when the accelerator pedal 44 is depressed to its maximum angular displacement when the engine is operating at idling speed with the transmission 42 set for the first speed, which improves acceleration response characteristics. When the speed of the transmission is changed from the first speed to the second speed in this state, the actual engine speed DN is decreased gradually to the upper limit desired engine speed Dx.

Accordingly, the actual engine speed DN of the engine 30 does not drop sharply to idling speed when the accelerator pedal is depressed for acceleration; the vehicle is accelerated at a high rate with the transmission 42 set for the first speed, and the running speed S is then limited to the maximum running speed $S_{max}$ with the transmission 42 set for the second speed. Therefore, unpleasant jerky deceleration does not occur when limiting the running speed S to the maximum running speed $S_{max}$ and hence deterioration of the operability of the industrial vehicle can be prevented.

An engine speed control method embodying the present invention, to be carried out by the engine speed control system of FIGS. 11 and 12 will be described hereinafter with reference to FIGS. 11, 12 and 16 to 19. This engine speed control method improves the response characteristics and engine speed control stability and prevents the engine from stalling during an excessive load, such as driving an hydraulic pump for operating the power steering system of the vehicle, during an idling operation.

When the engine 30 to be controlled by the engine speed control apparatus is a four-cycle four-cylinder internal-combustion engine, the engine speed control apparatus determines the actual engine speed each time the engine speed control apparatus receives two pulses of an ignition signal and calculates the deviation of the current and actual engine speed from a desired engine speed for the engine 30, because the output shaft 30*a* of the engine 30 rotates twice in a time equal to two periods of the ignition signal. Then, as stated above, the engine speed control apparatus carries out a PID calculation using the calculated deviation for PID control of a fixed gain to determine a desired opening of the throttle valve 36 of the carburetor 32 thereby making the engine 30 operate at a desired engine speed. The actuator 38 attached to the carburetor 32 is operated according to the desired opening of the throttle valve. The gain optimum for the PID control of engine speed in the engine speed range from idling speed to actual engine speed is selectively determined beforehand. Accordingly, the engine can be controlled in such an engine speed range that the actual engine speed will coincide with the desired engine speed. That is, the response characteristics deteriorate when the actual engine speed is lower than the idling speed.

Accordingly, an idling speed raising control is carried out to raise the idling speed. When the period of pulses of the ignition signal during an idling operation is longer than a predetermined critical period, a period longer than that which will cause the engine 30 to stall, i.e., when the actual engine speed is lower than a critical engine speed, an engine speed below that which will cause the engine to stall, the idling speed raising control operation controls the actuator 38 so as to increase the opening of the throttle valve 36 a predetermined angle E.

Figure 16:
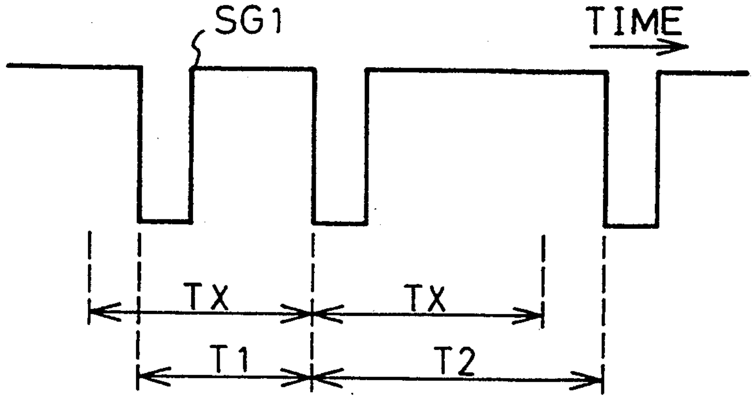
FIG. 16 is a diagram explaining the period of an ignition signal in carrying out an engine speed control method in a fifth embodiment according to the present invention.

Referring to FIG. 16, supposing that it is possible for the engine 30 to stall if the period of the ignition signal SG1 is longer than a predetermined critical period TX, the idling speed raising control is not executed when the period of the ignition signal SG1 is T1 shorter than the predetermined critical period TX, and the idling speed raising control is executed when the period of the ignition signal SG1 is T2 longer than the predetermined critical period TX.

In this embodiment, the critical period TX of the ignition signal is determined experimentally. In the following description, it is supposed that the critical period TX is 50 msec. The opening E of the throttle valve 36 for an idling operation is determined on the basis of the results of experiments, in which a load required for driving the hydraulic pump and for a cargo handling operation was loaded on the engine 30 so that the engine 30 does not stall even if such a load is applied thereon. In this embodiment, the opening E of the throttle valve 36 for an idling operation is 5.4°.

A variation of the characteristics of the internal-combustion engine 30 with time when the internal-combustion engine is loaded will be described with reference to FIG. 17, and the action of the control unit 85 for idling speed raising control and engine speed control when the internal-combustion engine is loaded during an idling operation will be described with reference to flow charts shown in Figs. 18 and 19.

Figure 17:
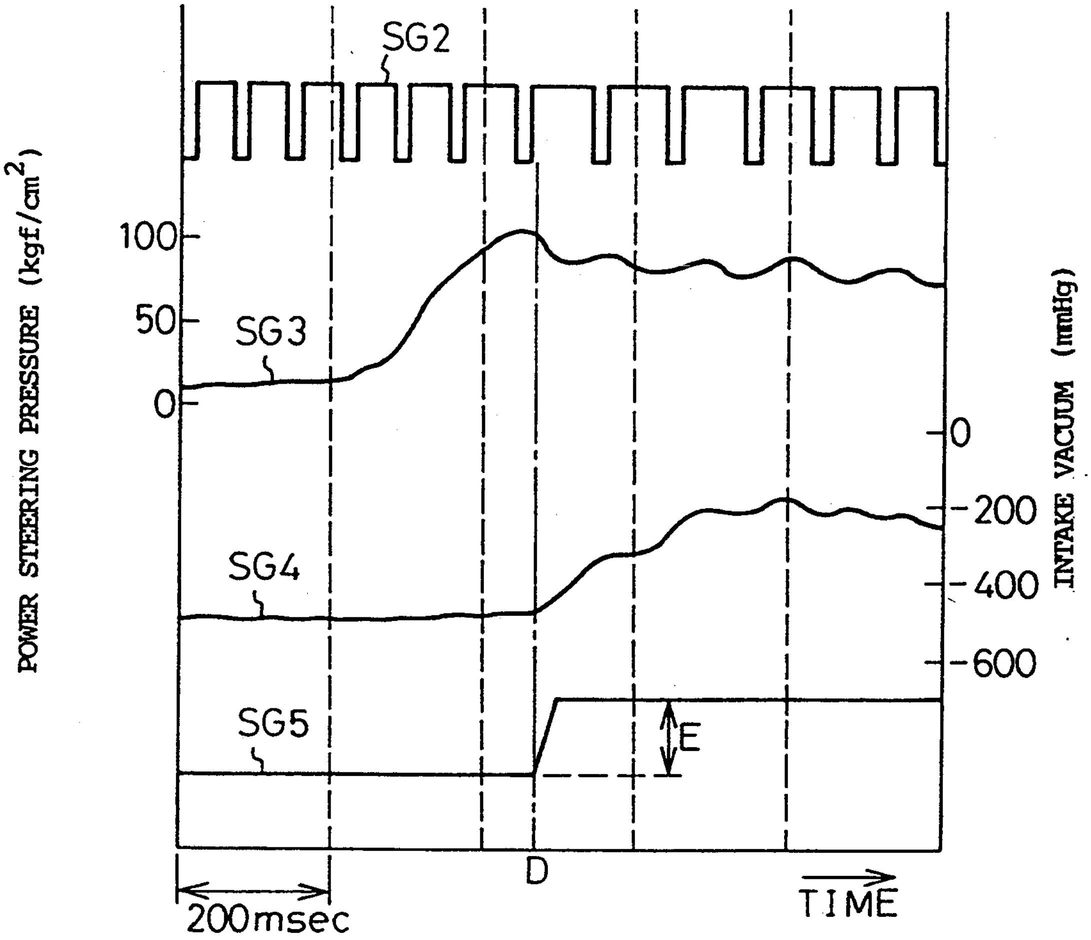
FIG. 17 is a characteristic graph showing characteristic variations with time when carrying out the engine speed control method described with reference to FIG. 16.

When the load of driving the hydraulic pump for operating the power steering system is applied to the internal-combustion engine 30 while the internal-combustion engine 30 is idling, the characteristics vary with time as shown in FIG. 17. The load varies with time according to a variation with time of the power steering pressure SG3 of the working fluid discharged from the hydraulic pump.

Figure 18:
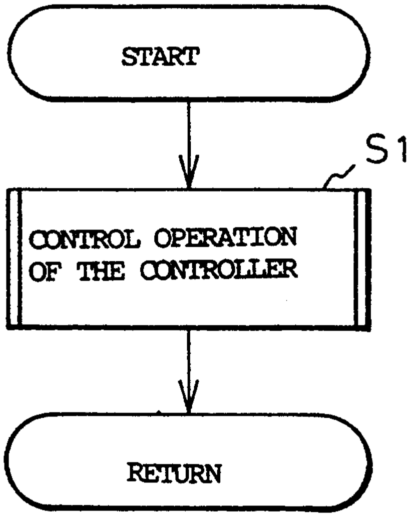
FIG. 18 is a flow chart explaining the operation of an engine speed control apparatus when applying the engine speed control method of FIG. 16.

Referring to FIG. 18, the control unit 85 executes an engine speed control routine in step S1 each time the same receives two pulses of the ignition signal thereof maintaining the actual engine speed at idling speed. A control routine shown in FIG. 19 interrupts the engine speed control routine shown in FIG. 18.

When the engine speed control routine is executed in step S1 of FIG. 18, the control unit 85 compares the period T of the input ignition signal and the critical period TX at predetermined time intervals (2 msec in this embodiment) in step S2. If the period T is longer than the critical period TX, i.e., if the actual engine speed is lower than the critical engine speed, namely, engine speed that will cause the engine 30 to stall, the idling speed raising control routine is executed in step S3. That is, at a moment when the period T of the ignition signal SG2 exceeds the critical period TX due to an increase in the power steering pressure SG3, namely, an increase in the load on the engine 30, i.e., at a moment (time D) when the actual engine speed decreases below the critical engine speed, the response characteristics of the engine speed control operation become ineffective and the engine 30 almost stalls.

Figure 19:
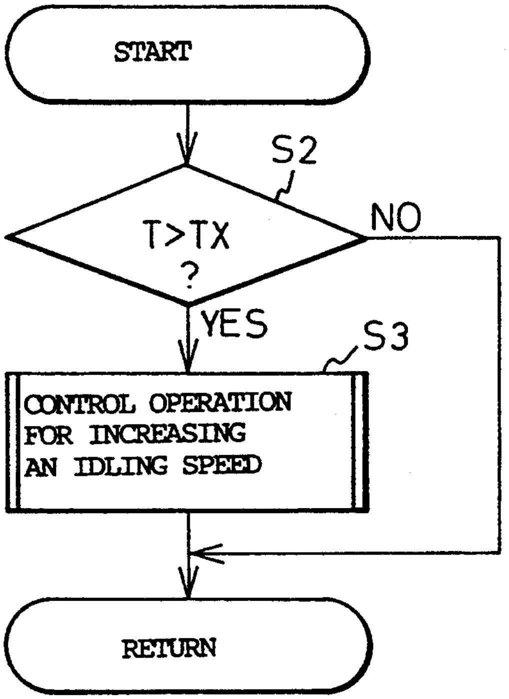
FIG. 19 is a flow chart of an idling speed increasing control routine included in the engine speed control method of FIG. 16.

Then, the engine speed control routine of FIG. 18 is interrupted to execute the idling speed raising control routine of FIG. 19 so as to increase the opening SG5 of the throttle valve 36 specified by the engine speed control operation a predetermined increment E.

Consequently, the period T of the ignition signal SG2 increases to the period of the ignition signal SG2, which had been provided before the power steering pressure SG3 was increased, with a slight time lag from the time D when the opening SG5 of the throttle valve 36 is increased. Thus, when the idling speed is reduced by an increased load, the predetermined idling speed for the engine is restored thereby preventing the engine from stalling by increasing the opening of the throttle valve 36 of the carburetor 32 and increasing the air intake rate. Even if the period T of the ignition signal SG2 is not reduced to the period of the ignition signal SG2 provided before the power steering pressure SG3 increases, the actual engine speed increases and the engine is capable of producing a torque sufficiently large to prevent the engine from stalling because the period T is reduced to some extent.

Although not shown in FIG. 17, when the period T of the ignition signal SG2 decreases below the critical period TX, i.e., when the actual engine speed increases beyond the critical engine speed, the engine speed control operation, shown in FIG. 18, is restarted to maintain the actual engine speed at idling speed by ending the interruption of the engine speed control routine by the idling speed raising control routine of FIG. 19.

As shown in FIG. 17, the manifold pressure SG4 acting on the carburetor 32 begins increasing with a slight time lag after an increase of the power steering pressure SG3, and the manifold pressure existing before an increase in the power steering pressure SG3 is restored, with a slight time lag after the time D, when the opening SG5 of the throttle valve 36 is increased. Thus, the manifold pressure SG4 increased by the increased load is reduced to a value before an increase in the load by increasing the opening SG5 of the throttle valve 36.

As is apparent from the foregoing description, the engine speed control method in this embodiment detects a reduction of the actual speed of the engine 30 below the critical engine speed, below which the response characteristics of the control of the speed of the engine 30 become ineffective because of the increase of the period of the ignition signal beyond the predetermined period, interrupts the engine speed control operation and executes the idling speed raising control operation, thereby securing good response characteristics and stability regardless of the engine speed.

Furthermore, in the case that the actual engine speed drops suddenly to a speed below idling speed, which could cause the engine 30 to stall because of a sudden application of load, such as driving the hydraulic pump of the power steering system or the like, during an idling operation, the engine speed control method detects the reduction of the actual engine speed from the increase of the period of the current ignition signal beyond the predetermined period, and increases the opening of the throttle valve immediately by a predetermined increment. Accordingly, the opening of the throttle valve 36 is increased in quick response to a reduction of the actual engine speed resulting from a sudden application of a load on the engine, thereby increasing the air intake rate so as to restore the predetermined idling speed, and ensuring that the engine will not stall.

Although the foregoing embodiment has been described as applied to controlling the engine speed of a four-cycle four-cylinder engine, naturally, the foregoing embodiment can be applied to controlling engines of industrial vehicles other than the four-cycle four-cylinder engine. When controlling the speed of an engine other than the four-cycle four-cylinder engine, the actual engine speed of the engine is determined each time the engine speed control system receives a suitable number of ignition signal pulses.

An engine speed control apparatus in a sixth embodiment according to the present invention will be described hereinafter with reference to FIGS. 20 and 21. The engine speed control apparatus in this embodiment is capable of improving response characteristics when controlling engine speed. The arrangement of the engine speed control apparatus in the sixth embodiment is substantially the same as that of the engine speed control apparatus shown in FIG. 11 and hence the components of the engine speed control apparatus in the sixth embodiment will be described with reference to FIG. 11.

Figure 20:
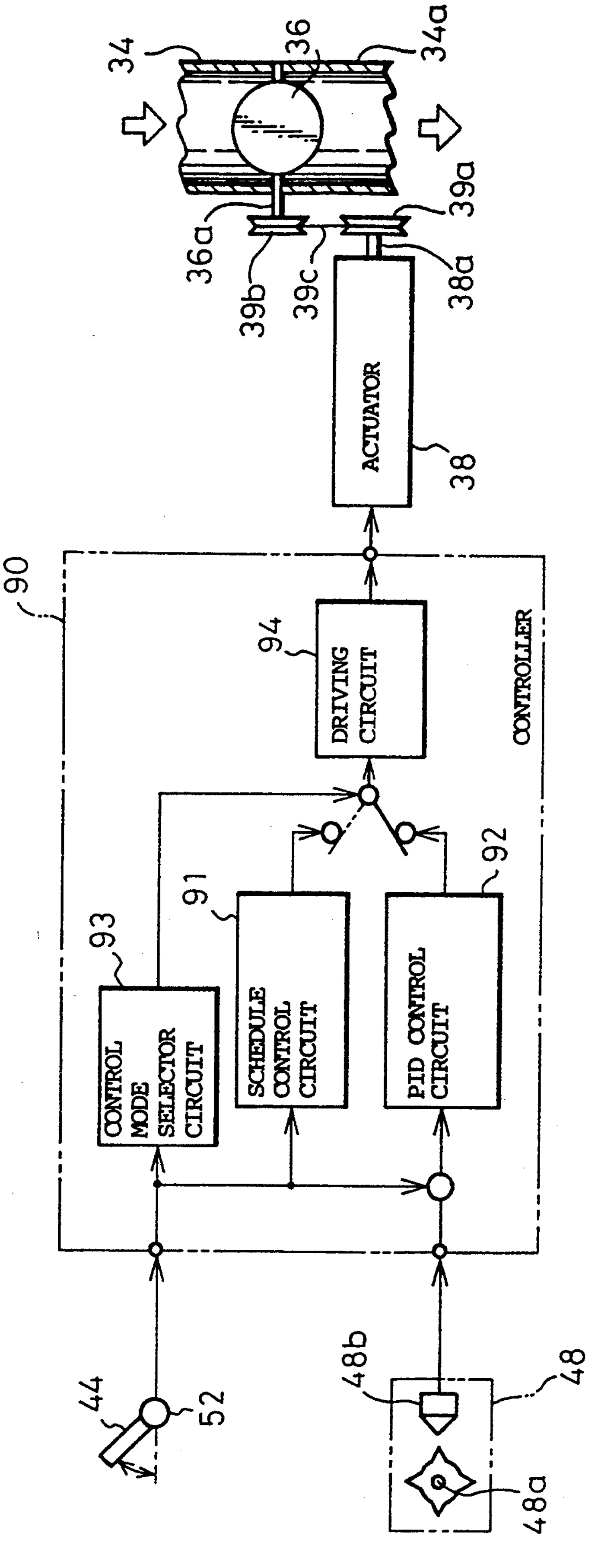
FIG. 20 is a block diagram showing the electrical configuration of an engine speed control apparatus in a sixth embodiment according to the present invention for controlling the engine speed of a gasoline engine mounted on a vehicle.

FIG. 20 is a block diagram showing the electrical configuration of a control unit or controller 90 included in the engine speed control apparatus. Referring to FIG. 20, an accelerator pedal displacement detector 52 that provides a detection signal representing an angular displacement of an accelerator pedal 44 corresponding to a desired engine speed D0 of an engine 30, and a distributor 48 for detecting an actual engine speed of the engine 30 are connected to the control unit 90. The distributor 48 comprises a rotor 48*a* that rotates according to the rotation of the output shaft of the engine 30, and a pickup 48*b* for periodically detecting the rotating speed of the rotor 48*a*. The control unit 90 of the engine speed control system in this embodiment, similar to those of the engine speed control systems in the foregoing embodiments, determines an actual engine speed DN from pulses of an ignition signal periodically provided by the distributor 48.

The control unit 90 comprises a microcomputer provided with an internal memory for storing control programs including an engine speed control program. The control unit 90 also comprises a schedule control circuit 91, a PID control circuit 92, a driving circuit 94 for electrically driving an actuator 38, and a control mode selector circuit 93 for selectively connecting either the schedule control circuit 91 or the PID control circuit 92 to the driving circuit 94. The control unit 90 receives a detection signal representing an angular displacement $\theta$ of the accelerator pedal 44 from the accelerator pedal displacement detector 52 and an ignition signal corresponding to an actual engine speed DN from the distributor 48. The control unit 90 executes the engine speed control program stored in the memory according to the input signals so as to control the actuator 38.

The operation of the engine speed control apparatus in this embodiment will be described with reference to a flow chart shown in FIG. 21.

Figure 21:
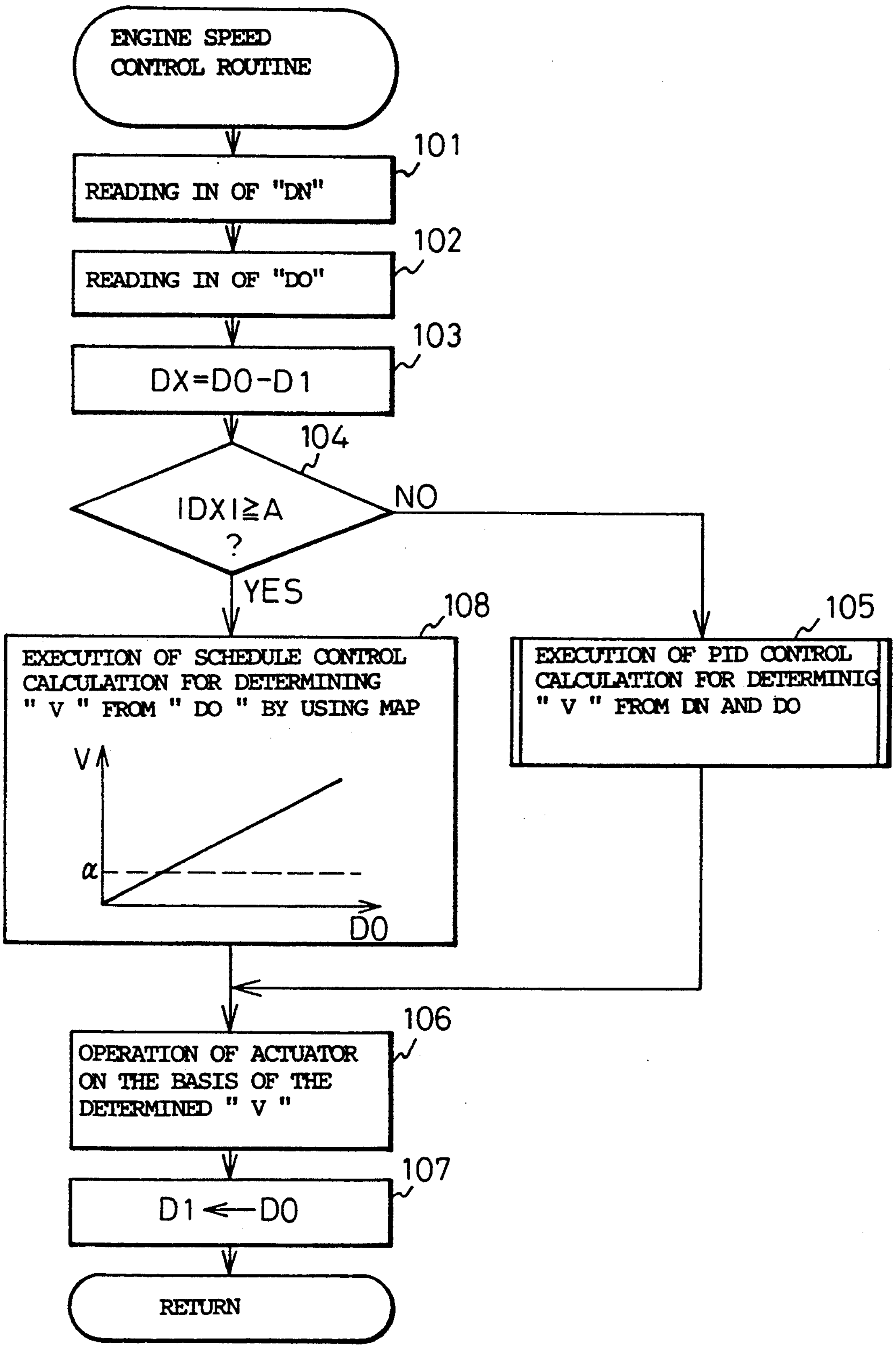
FIG. 21 is a flow chart of an engine speed control routine to be executed by a control unit included in the engine speeded control apparatus of FIG. 20.
Figure 22:
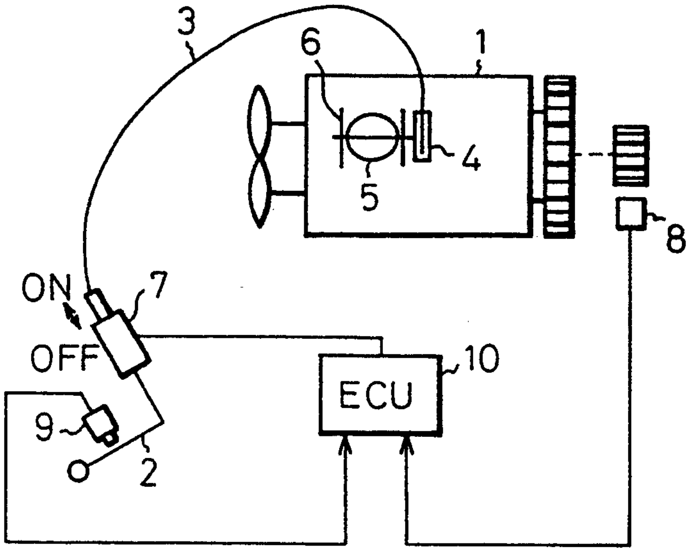
Fig.22 (PRIOR ART)
FIG. 22 is a block diagram of a prior art control apparatus for controlling the engine speed of an engine mounted on a vehicle.
Figure 23:
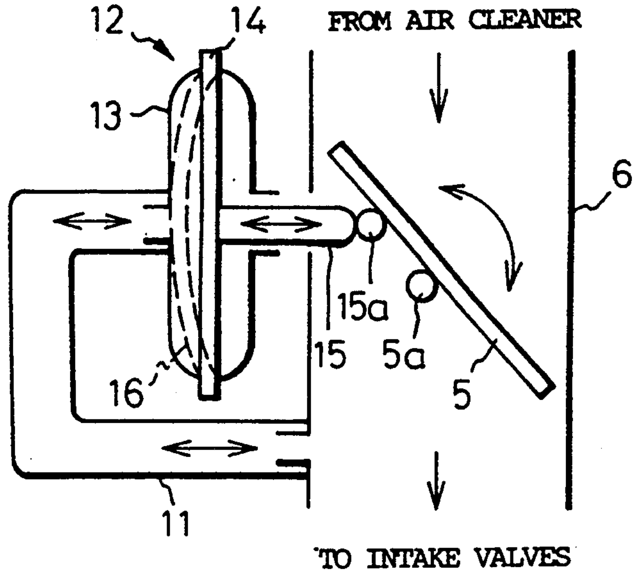
Fig.23 (PRIOR ART)
FIG. 23 is a schematic view of a prior art idling speed increasing device.
Figure 24:
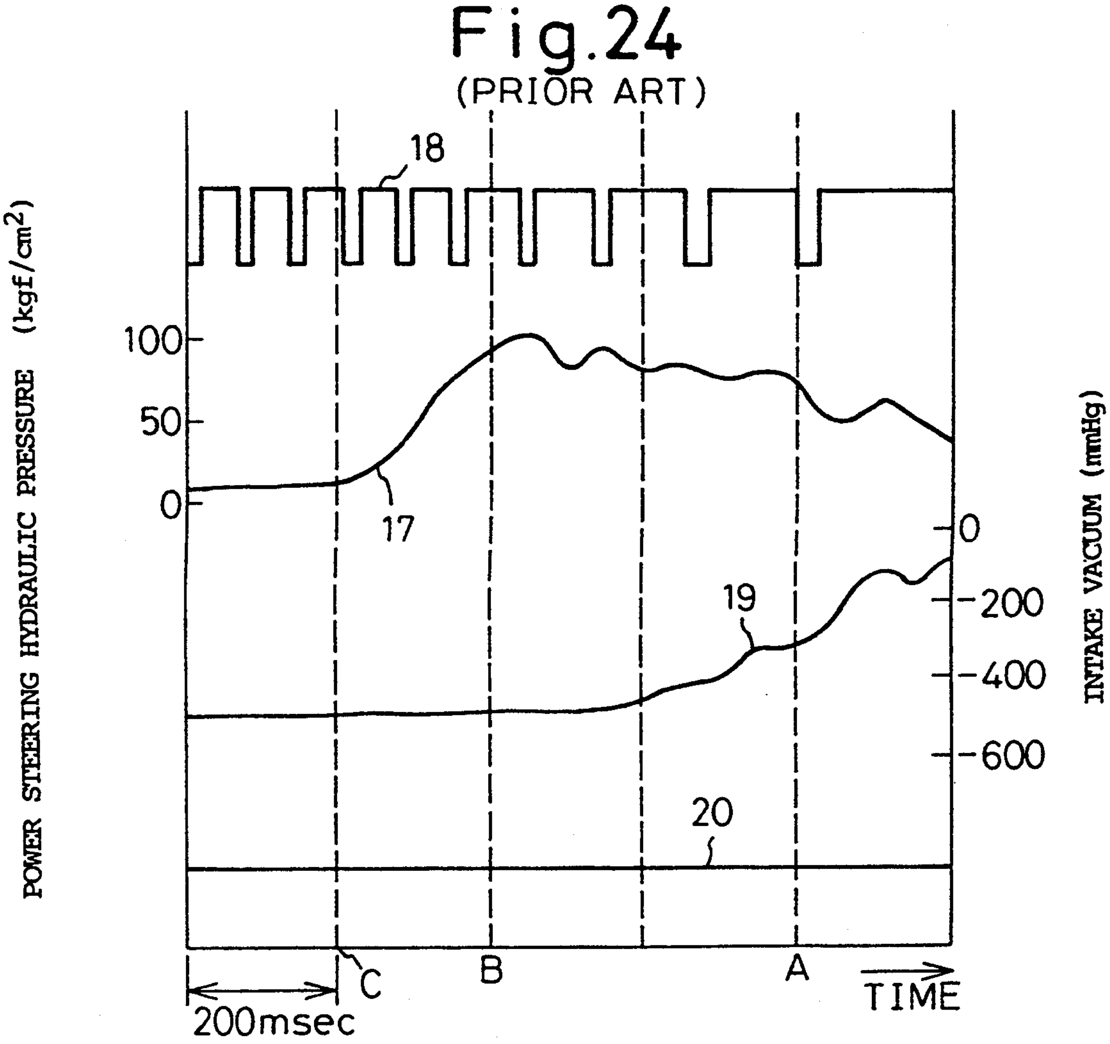
Fig.24 (PRIOR ART)
FIG. 24 is a graph showing characteristic variations with time when controlling the engine speed by a prior art engine speed control apparatus.

In step 101 of an engine speed control routine shown in FIG. 21 to be executed by the control unit 90 to control the speed of an engine 30, the control unit 90 determines an actual engine speed DN from the ignition signal provided by the distributor 48.

In step 102, the control unit 90 receives a detection signal representing an angular displacement $\theta$ of the accelerator pedal 44 from the accelerator pedal displacement detector 52 and reads a desired engine speed D0 corresponding to the angular displacement $\theta$ of the accelerator pedal 44 from a map of angular displacement $\theta$ values and corresponding values of desired engine speed D0 previously stored in the memory.

In step 103, the control unit 90 calculates the difference between the desired engine speed D0 determined in this control cycle and a desired engine speed D1 determined in the preceding control cycle, namely, a change DX in desired engine speed in one control cycle that is repeated, for example, at intervals of 10 msec.

In step 104, a query is made to determine whether the absolute value of the change DX in desired engine speed is larger than a prescribed value A, for example, 50 rpm. That is, a query is made to determine if a change in the detection signal representing the angular displacement $\theta$ provided by the accelerator pedal displacement detector 52 in one control cycle is larger than a prescribed value.

If the response in step 104 is negative, i.e., if the absolute value of the change DX is smaller than the prescribed value A, step 105 is executed to calculate the deviation of the actual engine speed DN from this desired engine speed D0 and to perform a calculation for PID control to calculate a desired quantity V of the actuator 38 operation corresponding to the desired opening of the throttle valve 36 on the basis of the calculated deviation. Then, in step 106, the actuator 38 is driven according to the desired quantity V of operation to set the throttle valve 36 at the desired opening. Thus, the control unit 90 executes a PID control operation once every two ignition cycles in synchronism with ignition timing to control the actuator 38. In step 107, the desired engine speed D1 determined in the preceding control cycle is replaced with the desired engine speed D0 determined in this control cycle for use as a desired engine speed D1 in the next control cycle, and the engine speed control routine is then ended.

On the other hand, if the response in step 104 is affirmative, i.e., if the absolute value of the change DX in desired engine speed is larger than the prescribed value A, a schedule control routine is executed in step 108 to determine a desired quantity V of operation corresponding to the desired opening of the throttle valve 36 determined for this desired engine speed D0.

In step 108, the desired quantity V of operation for the desired engine speed D0 is determined using a map as shown in step 108. If the change DX in engine speed is a positive value or a negative value, i.e., if the desired engine speed D0 is increased for acceleration or decreased for deceleration, the desired quantity V of operation is determined from a straight line indicated by a continuous line in the map. However, when a change DX in the desired engine speed is a large negative value, a predetermined guard value $\alpha$ for limiting the reduction of the speed of the engine 30 to a lower limit engine speed of, for example, 1,000 rpm, is used as the desired quantity V of operation.

In step 106, the actuator 38 is operated according to the desired quantity V of operation to increase the opening of the throttle valve 36. That is, the schedule control operation for forcibly opening the throttle valve 36 to a predetermined opening on the basis of the desired quantity V of operation corresponding to this desired engine speed D0 regardless of the desired quantity V of operation to be determined by PID control operation.

Thus, the control unit 90 controls the operation of the actuator 38 asynchronously with ignition timing. In step 107, the desired engine speed D1 determined in the preceding control cycle is replaced with the desired engine speed D0 determined in this control cycle so as to use the desired engine speed D0 as a desired engine speed D1 for the next control cycle., and then the engine speed control routine is then ended. In this embodiment, the control unit 90 selectively executes either the PID control operation or the schedule control operation according to a change in the angular displacement $\theta$ of the accelerator pedal detected by the accelerator pedal displacement detector 52. That is, as shown in FIG. 20, if a change in unit time in the angular displacement $\theta$ of the accelerator pedal detected by the accelerator pedal displacement detector 52 is smaller than the prescribed value A, the control mode selector circuit 93 connects the PID control circuit 92 to the driving circuit 94, and the PID control circuit 92 then operates for PID control on the basis of both the ignition signal provided by the distributor 48 and the angular displacement $\theta$ determined from the detection signal provided by the accelerator pedal displacement detector 52 and controls the driving circuit 94 so as to operate the actuator 38.

When the change in unit time in the angular displacement $\theta$ of the accelerator pedal determined from the detection signal provided by the accelerator pedal displacement detector 52 is not smaller than the prescribed value A, the control mode selector circuit 93 connects the schedule control circuit 91 to the driving circuit 94. The schedule control circuit 91 operates for schedule control only on the basis of the angular displacement $\theta$ determined from the detection signal provided by the accelerator pedal displacement detector 52 and controls the driving circuit 94 so as to operate the actuator 38.

Accordingly, a change in unit time of the angular displacement $\theta$ of the accelerator pedal 44 detected by the accelerator pedal displacement detector 52 is greater than a prescribed value if the angular displacement of the accelerator pedal 44 is increased significantly in a predetermined time by suddenly depressing the accelerator pedal 44 or decreased significantly in a predetermined time by releasing the accelerator pedal 44. Therefore, the control unit 90 operates the actuator 38 so as to increase the opening of the throttle valve 36 to a predetermined opening regardless of the results of the calculation for the PID control.

Therefore, if the control unit 90 controls the engine speed in synchronism with the period of an ignition signal provided by the distributor 48, namely, in synchronism with the period of the actual engine speed DN, the opening of the throttle valve 36 is adjusted forcibly to the predetermined opening when the angular displacement of the accelerator pedal 44 is increased beyond a predetermined value even if the actual engine speed DN of the engine 30 is, for example, as low as the idling speed. Accordingly, the throttle valve 36 is operated in quick response to the operation of the accelerator pedal 44 without delay even though the period of engine speed control operation is relatively long, so that the actual engine speed DN of the engine 30 is quickly controlled.

Consequently, the response of the engine speed control operation to the command value of the desired engine speed D0 corresponding to the angular displacement $\theta$ of the accelerator pedal 44 can be improved and thereby the engine speed can be adjusted to the desired engine speed D0 in a short time.

When the accelerator pedal 44 is released and allowed to turn through a large angle to its original position and the change DX in the desired engine speed is a large negative value, the guard value $\alpha$ is employed as the desired quantity V of operation to thereby control the opening of the throttle valve 36 so that the engine speed of the engine 30 will not decrease below 1,000 rpm. Accordingly, the engine speed does not drop below 1,000 rpm even if the operating condition of the engine 30 is changed from a high engine speed to idling speed, whereby stalling of the engine 30, attributable to the sudden drop in engine speed, can be prevented.

Although the foregoing engine speed control apparatus selects either the PID control circuit 92 for PID control or the schedule control circuit 91 for schedule control with reference to the magnitude of the change DX in the desired engine speed D0 corresponding to the angular displacement $\theta$ of the accelerator pedal 44, the PID control circuit 92 or the schedule control circuit 91 may be selected with reference to a change in the angular displacement $\theta$ of the accelerator pedal 44.

Although the invention has been described in its preferred embodiments, it is to be understood that various changes and modifications may be made in the invention without departing from the scope and spirit thereof as hereinafter claimed.

What is claimed is:

1. An apparatus for controlling the speed of an engine for driving a vehicle in which an accelerator pedal mounted on said vehicle is connected to a throttle valve of said engine, said apparatus comprising:

an actuator means for operating said throttle valve of said engine;

an engine speed detecting means for detecting the speed of said engine;

an accelerator pedal detecting means for detecting the displacement of said accelerator pedal of said vehicle;

a desired engine speed setting means for storing a plurality of desired engine speeds therein and selectively determining from said plurality the desired engine speed that corresponds to the displacement detected by said accelerator pedal detecting means;

an upper limit engine speed setting means for determining a maximum value of said plurality of desired engine speeds stored in and selectively determined by said desired engine speed setting means as at least one predetermined upper limit engine speed not higher than a no-load maximum engine speed for said engine; and a control means including an arithmetic calculation means for calculating the differential between the actual engine speed detected by said engine speed detecting means and the desired engine speed corresponding to the detected displacement of said accelerator pedal detected by said accelerator pedal detecting means when the actual engine speed is lower than said predetermined upper limit engine speed determined by said upper limit engine speed setting means, and being operative so as to control said actuator means according to the result of the differential calculated by said arithmetic calculation means so that said actual engine speed coincides with the desired engine speed determined by said desired engine speed setting means.

2. An apparatus according to claim 1, wherein said upper limit engine speed setting means is coupled to said control means, and further comprises a means for variably setting a plurality of digital values corresponding to maximum engine speeds not higher than said no-load maximum engine speed.

3. An apparatus according to claim 2, wherein said control means further includes a storage means for storing the maximum engine speed determined by said upper limit engine speed setting means, and is constructed and arranged to control said actuator means such that said actual engine speed coincides with the predetermined maximum engine speed regardless of the displacement of said accelerator pedal detected by the accelerator pedal detecting means when said actual engine speed is as high as said predetermined maximum engine speed.

4. An apparatus according to claim 1, further comprising a vehicle speed detecting means for detecting the actual running speed of said vehicle;

said upper limit engine speed setting means being connected to said control means, and comprising a maximum running speed setting means for setting at least one maximum running speed of said vehicle; a storage means arranged in said control means for storing a maximum desired engine speed corresponding to said maximum running speed of said vehicle set in advance by said maximum running speed setting means; and said control means further comprises:

a first control means constructed to read the desired engine speed corresponding to the detected displacement of said accelerator pedal detected by said accelerator detecting means from said desired engine speed setting means when the actual running speed of said vehicle detected by said vehicle speed detecting means is not higher than the maximum running speed determined by said maximum running speed setting means, and controlling said actuator means to regulate the amount of opening of said throttle valve thereby obtaining said desired engine speed; and a second control means constructed to read the upper limit for engine speed corresponding to the maximum running speed set by the maximum running speed setting means from said storage means when the actual running speed of said vehicle reaches the maximum running speed set by said maximum running speed setting means, and said second control means controlling said actuator means to regulate the amount of opening of said throttle valve to obtain an actual engine speed equal to said upper limit engine speed.

5. An apparâtus according to claim 4, wherein said control means comprises an electronic microcomputer, and said maximum running speed setting means comprises an electrical voltage control connected to said electronic microcomputer; and wherein said storage means of said control means includes a map memory for storing a plurality of upper limit engine speeds of said engine corresponding, respectively, to a plurality of maximum running speeds set by said maximum running speed setting means.

6. An apparatus according to claim 1, wherein said engine is coupled through a multiple speed transmission to propulsion means for said vehicle, said apparatus further comprising:

a running speed detecting means for detecting the running speed of said vehicle;

a transmission detecting means for detecting whether said transmission is shifted to a low speed position or a high speed position; and a decision means for determining whether said transmission is in a low-speed position or a high-speed position on the basis of a detection signal provided by said transmission detecting means;

said upper limit engine speed setting means being connected to said control means and comprising a maximum running speed setting means for variably setting a plurality of maximum running speeds for said vehicle, and a second storage means is arranged in said control means for storing upper limit desired engine speeds corresponding to a plurality of maximum running speeds for said vehicle set in advance by said maximum running speed setting means;

said control means further comprising:

a first throttle opening control means reading said desired engine speed corresponding to the maximum displacement of said accelerator pedal detected by said accelerator pedal detecting means from said desired engine speed setting means when said transmission is set at the low-speed position and said accelerator pedal is fully displaced to the maximum displacement thereof, and controlling said actuator means to regulate the opening of said throttle valve; and a second throttle opening control means reading said desired maximum engine speed corresponding to the maximum running speed set by said maximum running speed setting means immediately from the second storage means when said transmission is shifted from the low-speed position to the high-speed position; the running speed of said vehicle is not lower than a predetermined value for running with the transmission set for the low-speed position and said accelerator pedal displaced to the maximum displacement thereof, and controlling said actuator means so as to regulate the opening of said throttle valve thereby causing actual engine speed to coincide with the desired maximum engine speed.

7. An apparatus for controlling the speed of an automotive internal combustion engine mounted on a vehicle in which an accelerator pedal mounted on said vehicle is connected to a throttle valve disposed within an air intake passage of said internal combustion engine, and in which the engine is coupled to a propulsion train of the vehicle by a multiple speed transmission, said apparatus comprising:

an actuator means for moving said throttle valve from a closed position to an open position and vice versa;

an accelerator pedal detecting means for detecting the displacement of said accelerator pedal when said pedal is displaced to command said internal combustion engine to operate at a desired engine speed;

a desired engine speed determining means for determining the desired engine speed corresponding to said displacement of said accelerator pedal as detected by said accelerator pedal detecting means;

an engine speed detecting means for detecting the actual engine speed of said internal combustion engine;

a throttle valve opening calculating means for calculating the differential between the actual engine speed detected by said engine speed detecting means and the desired engine speed determined by said desired engine speed determining means, and calculating a desired opening for said throttle valve from the result of the calculated differential;

a control means for controlling said actuator means to regulate the operation of said throttle valve according to the result of said calculated differential;

a maximum desired engine speed setting means for setting a maximum desired engine speed that corresponds to a maximum running speed of said vehicle corresponding to the maximum displacement of said accelerator pedal; and a transmission speed detecting means for detecting whether the transmission is set at a low-speed position or a high-speed position;

said control means comprising:

a low-speed position control means for controlling said actuator means to regulate said throttle valve according to the result of said differential calculation when said transmission speed detecting means detects that said transmission is shifted to the low-speed position thereof; and a high-speed position control means for controlling said actuator means to regulate said throttle valve so that the maximum desired engine speed is an upper limit engine speed when said transmission speed detecting means determines that said transmission is shifted to the high-speed position thereof.

8. An apparatus according to claim 7, wherein said control means further comprises:

supplemental actuator control means for setting said throttle valve at a predetermined opening regardless of the results of said calculated differential when the variation of the displacement of said accelerator pedal in a predetermined time interval detected by said accelerator pedal detecting means is not smaller than a predetermined value.

9. An apparatus according to claim 8, wherein said control means further comprises:

a deciding means that calculates the difference between two successive angular displacements detected by said accelerator pedal detecting means separated by predetermined time interval, and decides whether or not the difference is equal to or larger than the predetermined value, and makes the supplemental actuator control means control said actuator means to set the throttle valve at the predetermined opening when the difference calculated by the deciding means is equal to or larger than the predetermined value.

10. An apparatus according to claim 9, wherein said supplemental actuator control means further comprises:

a driving circuit connected to said actuator means; and a schedule control circuit for operating said driving circuit to provide said actuator means with a predetermined drive output.

11. An apparatus for controlling the speed of an automotive internal combustion engine for driving a vehicle in which an accelerator pedal mounted on said vehicle is connected to a throttle valve disposed within an air intake passage of said automotive internal combustion engine, and in which the engine is coupled to the propulsion train of the vehicle by a multiple speed transmission, said apparatus comprising:

an actuator means for operating said throttle valve;

an accelerator pedal detecting means for detecting the displacement of said accelerator pedal when said pedal is displaced so as to command said internal combustion engine to operate at a desired engine speed;

a desired engine speed determining means for determining the desired engine speed corresponding to the displacement of said accelerator pedal as detected by said accelerator pedal detecting means;

an engine speed detecting means for detecting the actual engine speed of said internal combustion engine;

a throttle valve opening calculating means for calculating the differential between the actual engine speed detected by said engine speed detecting means and the desired engine speed determined by the desired engine speed determining means, and calculating a desired opening of said throttle valve from said calculated differential;

a maximum engine speed setting means for setting a maximum engine speed equivalent to a maximum running speed of said vehicle corresponding to the maximum displacement of said accelerator pedal;

a transmission speed detecting means for detecting whether said transmission is shifted to a low-speed position or a high-speed position;

a low-speed range control means for controlling said actuator means to position said throttle valve at said desired opening according to the result of the differential calculation when said transmission speed detecting means detects that said transmission is set at the low-speed position thereof; and a high-speed range control means for controlling said actuator means to position said throttle valve at said desired opening such that the maximum engine speed is limited to the maximum desired engine speed set by said maximum engine speed setting means when said transmission detecting means detects that said transmission is set at the high-speed position thereof.

12. An apparatus for controlling the speed of an engine for driving a vehicle in which an accelerator pedal mounted on said vehicle is connected to a throttle valve of said engine, said apparatus comprising:

a running speed detecting means for detecting the running speed of said vehicle;

an engine speed detecting means for detecting the engine speed of said engine;

an actuator means for operating said throttle valve of said engine;

an accelerator pedal detecting means for detecting the displacement of said accelerator pedal of said vehicle;

a maximum running speed setting means for setting at least one maximum running speed for said vehicle;

a storage means for storing an upper limit engine speed corresponding to said at least one maximum running speed, and for storing a plurality of desired engine speeds for the engine corresponding, respectively, to a plurality of angular displacements of the accelerator pedal;

a first control means that reads the desired engine speed that corresponds to the angular displacement of the accelerator pedal detected by the accelerator pedal displacement detecting means from the storage means when the running speed of the vehicle detected by the running speed detecting means is not higher than the maximum running speed set by the maximum running speed setting means, said first control means controlling the actuator means for regulating the operation of the throttle valve for causing the engine speed to coincide with said desired engine speed read from the storage means; and a second control means that reads the upper limit engine speed corresponding to said maximum running speed set by the maximum running speed setting means from the storage means when the running speed of the vehicle detected by the running speed detecting means is as high as said maximum running speed set by the maximum running speed setting means, said second control means controlling the actuator means for regulating the operation of the throttle valve for causing the engine speed to coincide with said upper limit engine speed.

13. A method for controlling the speed of an automotive internal combustion engine for driving a vehicle, characterized in that the opening of a throttle valve of said internal combustion engine is increased by a predetermined increment when a current period of ignition signal pulses delivered by an ignition means of said internal combustion engine exceeds a predetermined critical period of ignition signal pulses that may cause said internal combustion engine to stall, while the internal combustion engine is idling.

* * * * *